United States Patent [19]

Nakazawa et al.

[11] Patent Number: 5,583,751

[45] Date of Patent: Dec. 10, 1996

[54] POWER SUPPLY UNIT FOR ELECTRIC MOTOR VEHICLE

[75] Inventors: Yoshihiro Nakazawa; Kenji Tamaki; Masayuki Toriyama; Kenji Kawaguchi, all of Saitama, Japan

[73] Assignee: Honda Giken Kogyo Kabushiki Kaisha, Tokyo, Japan

[21] Appl. No.: 307,015

[22] Filed: Sep. 16, 1994

[30] Foreign Application Priority Data

Sep. 16, 1993 [JP] Japan ..................... 5-230484

[51] Int. Cl.$^6$ ................................. H02M 3/335
[52] U.S. Cl. .......................................... 363/20
[58] Field of Search ................. 363/15, 16, 20, 363/123, 124, 131; 320/1, 2; 318/778, 800, 806

[56] References Cited

U.S. PATENT DOCUMENTS

| | | | |
|---|---|---|---|
| 4,136,382 | 1/1979 | Ricci | 363/137 |
| 4,896,637 | 1/1990 | Yamamoto | 123/179 B |
| 5,041,776 | 8/1991 | Shirata et al. | 320/1 |
| 5,418,401 | 5/1995 | Kaneyuki | 307/10.1 |

FOREIGN PATENT DOCUMENTS

| | | |
|---|---|---|
| 0116925 | 8/1984 | European Pat. Off. . |
| 0531200 | 3/1993 | European Pat. Off. . |
| 2353157 | 12/1977 | France . |
| 2235836 | 3/1991 | United Kingdom . |

Primary Examiner—Matthew V. Nguyen

[57] ABSTRACT

A main switch with a low withstand voltage usable to prevent a leak current from flowing from a floated running power supply by way of the main switch even when the insulation between the main switch and the body grounding is reduced. A running power supply for supplying power to a running motor, which includes a plurality of batteries connected in series to each other, is kept in the floating state with respect to the body grounding. Moreover, there is provided a step-down DC-DC converter of an input-output insulation type. A diode and a main switch are provided from a battery constituting part of the running power supply in this order to supply a starting power or starting signal to the DC-DC converter for starting the DC-DC converter. Thus, power is supplied to the input side of the DC-DC converter from the running power supply, to obtain a step-down accessary power supply VB.

17 Claims, 32 Drawing Sheets

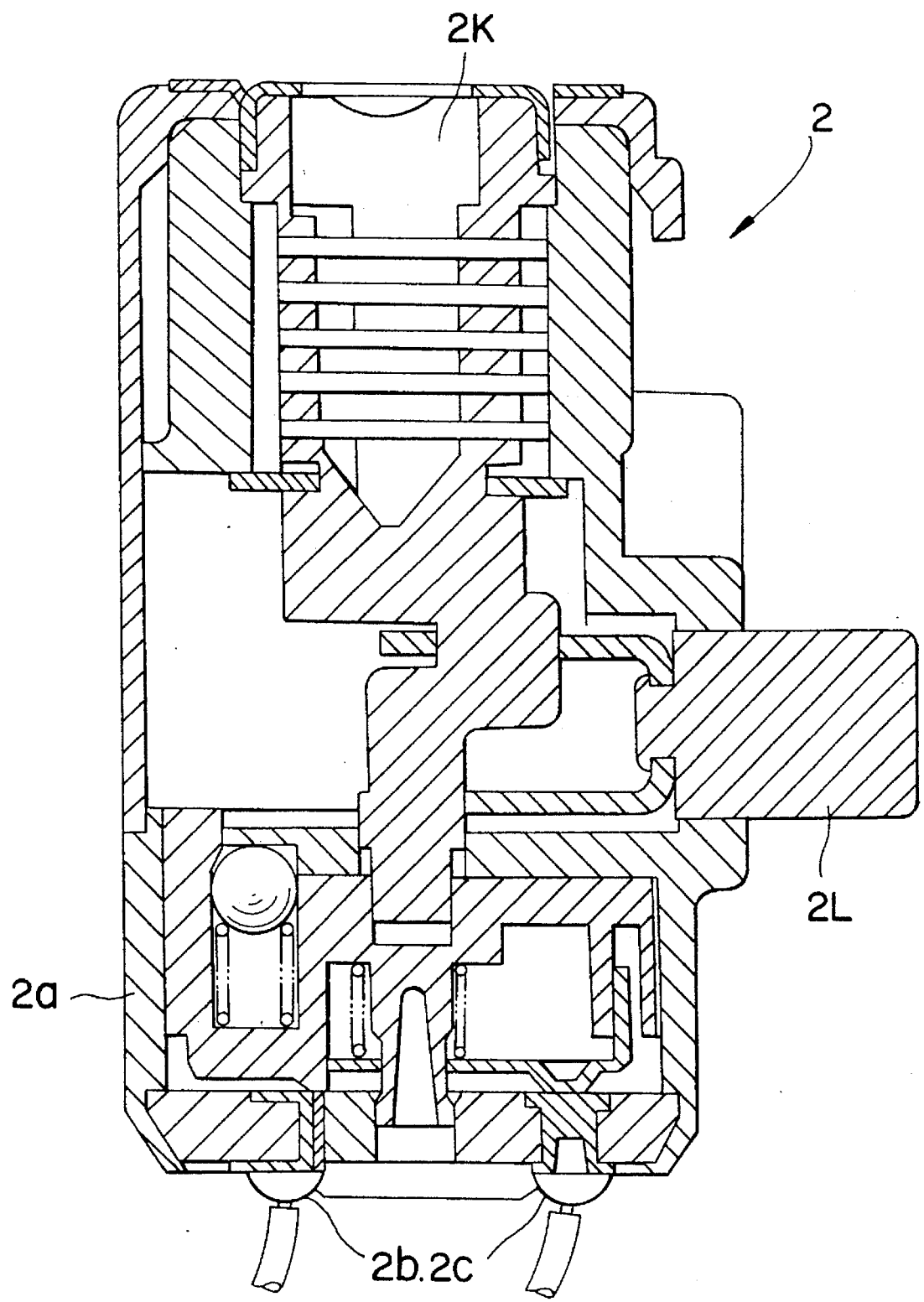

5,583,751

1

POWER SUPPLY UNIT FOR ELECTRIC MOTOR VEHICLE

BACKGROUND OF THE INVENTION

1. Field of the Invention

The present invention relates to a power supply unit for an electric motor vehicle capable of obtaining an accessary power supply from a running power supply kept in the floating state by way of an input-output insulation type DC-DC converter, wherein one end of the accessary power supply is connected to the body grounding. In particular, the present invention concerns a power supply unit for an electric motor vehicle in which a power or signal for starting an accessary power supply is obtained from a running power supply by way of a main switch such as an ignition key, wherein a switch having a low withstand voltage is usable and a leak current is prevented from flowing the running power supply even when the insulation between the contact of the main switch and the body grounding is lowered.

2. Description of Background Art

In general, an electric motor vehicle includes a running power supply and an accessary power supply. The running power supply is adapted to mainly supply power to a running motor. The running power supply includes, generally, a high voltage from several tens to several hundreds of volts (V), and is thereby kept in the floating state, one end of the power supply is not connected to the body grounding.

The accessary power supply is adapted to supply power required for various controllers and lighting devices, and has generally a low voltage of 12 to 24 V or less. Accordingly, one end of the accessary power supply is connected to the body grounding for lowering the grounding impedance of the accessary power supply; and a body made of metal is employed as the return path of the drive current for a lighting device thereby omitting the wiring used for the current return path.

An electric motor vehicle is known which includes a special battery as an accessary power supply separately from the running power supply. However, to reduce the space for mounting the battery and the weight of the battery, there has been mostly used an electric motor vehicle of a type having an input-output insulation type DC-DC converter for obtaining an accessary power supply by the step-down conversion from a running power supply.

FIG. 32 is a circuit diagram showing the construction of a prior art power supply unit for an electric motor vehicle wherein an accessary power supply is obtained by the step-down conversion from a running power supply kept in the floating state.

In a prior art power supply unit 1 for an electric motor vehicle, a main switch 2, for example an ignition key switch, is used as the starting switch, and a power supply voltage VM of a running power supply 3 is supplied to a starting control terminal 4a of a DC-DC converter 4 of an input-output insulation type by way of the main switch 2, thereby obtaining a step-down accessary power supply VB on the output side of the DC-DC converter 4. A starting circuit 5 is formed of, for example, a relay 6. An exciting winding 6a of the relay 6 is energized, and the running power supply 3 is supplied to the input side of a DC-DC conversion circuit 4A by way of a contact 6b of the relay 6, to start the DC-DC conversion. The accessary power supply VB is connected, for example, on the negative electrode side, to the grounding body.

2

When the accessary power supply VB is raised, the lighting device system of a vehicle is in the operable state, and various controllers are started to be operated. For example, on the basis of an energizing command from a motor drive controller, each semiconductor switching element (not shown) within a power inverter is driven, to supply power to a running motor, thus making the vehicle operable.

The switching of the DC-DC converter 4 may be directly performed by the main switch 2, without the relay 6. However, in this case, a switch with a large current capacity is required; and further, a contact tends to be damaged by switching a relatively large current.

For this reason, as shown in FIG. 32, to switch the power supply on the input side of the DC-DC converter 4, a relay 6 is driven by way of the main switch 2; or semiconductor switching elements (not shown) are driven in place of the relay 6.

However, since the running power supply 3 has a high voltage, the main switch 2 requires a high withstand voltage.

In another power supply unit 11 for an electric motor vehicle shown in FIG. 33, a starting power or a starting signal is supplied from a battery unit 3a constituting part of the running power supply 3 including a plurality of battery units 3a to 3n connected in series to each other to a starting control terminal 4a of the DC-DC converter 4 by way of the main switch 2, thus starting the DC-DC converter 4. With this construction, it is possible to use the main switch having a low withstand voltage between contacts.

On the other hand, the main switch 2 for starting the accessary power supply is an important key for controlling the turn on/off of the whole electrical system of the electric motor vehicle. Accordingly, as shown in FIG. 34, the opening/closing of contacts is performed by inserting a key in a key insertion hole 2K and turning the key. Further, a lock pin 2L for restricting the operation of the steering system is interconnected therewith. A body 2a of the main switch 2 composed of the key switch is made of metal, and in general, the main switch 2 is mounted on the metal portion of a vehicle forming the body grounding.

As described above, in the prior art power supply unit, the main switch is turned on to supply a starting power or starting signal from the running power supply, thus raising the accessary power supply. However, as shown in FIG. 34, in view of the fact that the structure of the main switch 2 and the contact are in close proximity to the body 2a of the switch, the body 2a of the main switch 2 forms the body grounding. Accordingly, the insulating resistance to the body grounding tends to be reduced due to water permeation, equivalent insulating resistance value R1 of the main switch 1 shown in FIG. 33 is reduced. Moreover, when the insulating resistance between the positive electrode side of the running power supply and the body grounding is simultaneously reduced, equivalent insulating resistance R2 in FIG. 33 between the running power supply 3 and the body grounding is reduced, as shown by the broken line of FIG. 33, a leak current LC flows, through the main switch 2, along the route of the high voltage side of the running power supply 3, equivalent insulating resistance R2, body grounding equivalent insulating resistance R1 of the main switch 2-low voltage side of the running power supply 3. This causes disadvantages in generating unnecessary current consumption from the running power supply 3 and applying a high voltage to the contact of the main switch 2.

To solve the above problems, the present invention has an object to provide a power supply unit for an electric motor vehicle capable of using a main switch having a low withstand voltage, and blocking a leak current flowing along the starting route of an accessary power supply containing the main switch.

To achieve the above object, according to the present invention, there is provided a power supply unit for an electric motor vehicle including a running power supply for supplying power to a running motor which includes a plurality of batteries connected in series to each other, and which is kept in the floating state with respect to the body grounding. A step-down type DC-DC converter is provided in which the input side is insulated from the outside. A diode and a main switch are at least provided in this order from a battery constituting part of the running power supply, to supply a starting power or a starting signal to the DC-DC converter for controlling the DC-DC converter to be operated, thereby supplying power from the running power supply to the input side of the DC-DC converter and obtaining a step-down accessary power supply on the output side of the DC-DC converter.

When a main switch is turned on, a starting power or starting signal is supplied to a DC-DC converter by way of a diode or the main switch, to start the operation of the DC-DC converter, thus supplying an accessary power supply.

The diode is interposed along the direction of supplying a starting power or starting signal from the battery of the running power supply to the DC-DC converter, so that it can prevent the current flowing in the reverse direction.

For example, even if the insulation of the main switch is reduced due to the water permeation and the insulation between the running power supply and the body grounding is reduced, a leak current flowing in the direction from the body grounding to the running power supply is blocked by the diode. Therefore, it becomes possible to prevent the generation of a leak current, to eliminate unnecessary current consumption from the running power supply, and to prevent the high voltage applied to the contact of the main switch.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 34 is an illustrative view of the structure of a main switch.

DETAILED DESCRIPTION OF THE PREFERRED EMBODIMENTS

Figure 1:
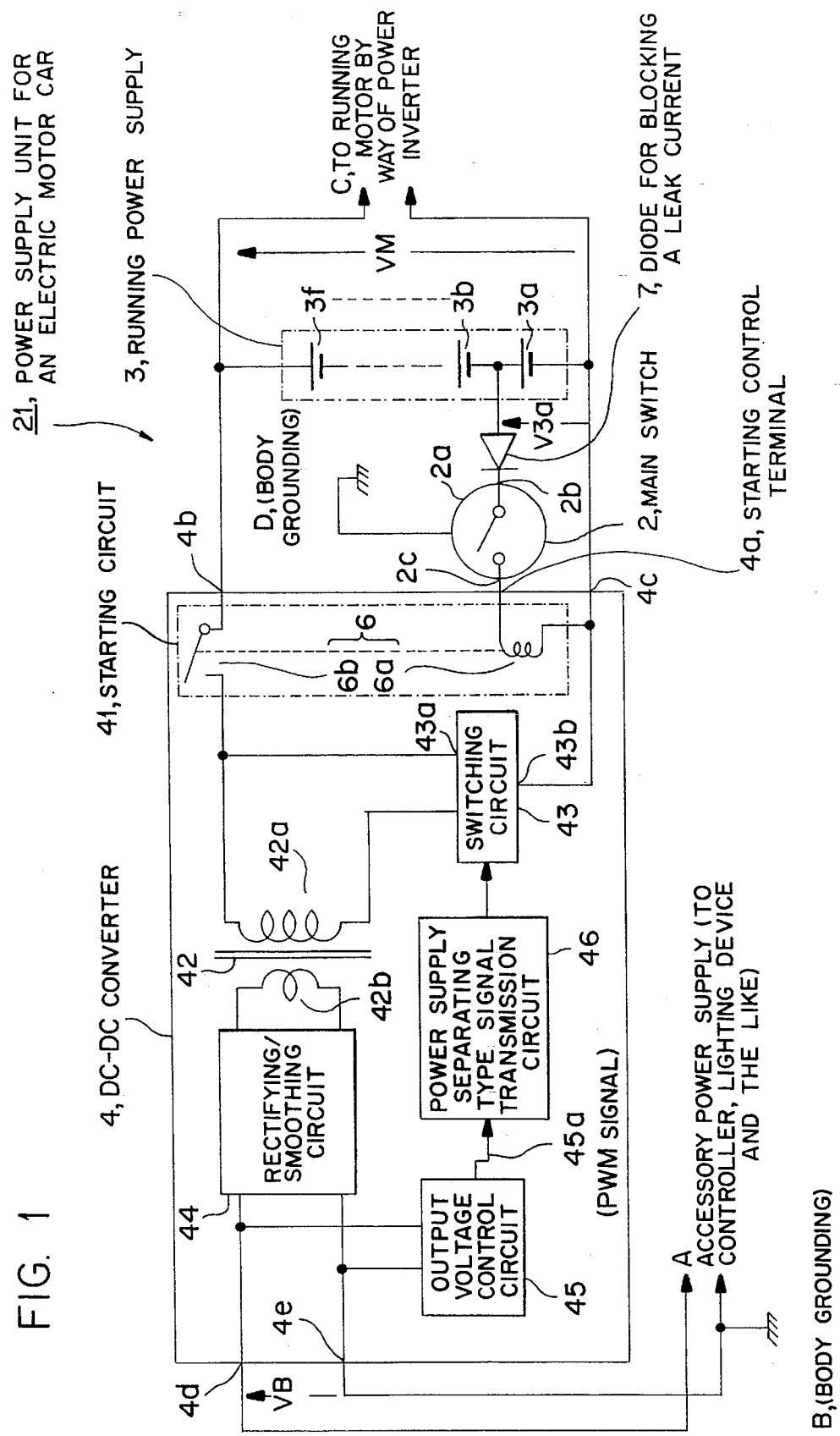
FIG. 1 is a circuit diagram of a power supply unit for an electric motor vehicle according to the present invention.

Hereinafter, embodiments of the present invention will be described with reference to the accompanying drawings. FIG. 1 is a circuit diagram of a power supply unit for an electric motor vehicle according to the present invention.

A power supply unit 21 for an electric motor vehicle according to the present invention includes a running power supply 3, a DC-DC converter 4, a main switch 2, and a diode 7 for blocking a leak current.

The running power supply 3 is adapted to supply power to a running motor (not shown), and to supply power to the input side of the DC-DC converter 4 for producing an accessary power supply with the step-down voltage on the output side of the DC-DC converter 4. The power supply 3 contains a plurality of battery units (for example, six batteries) $3a$ to $3f$ connected in series to each other for obtaining a running power supply voltage VM having a high voltage (for example 86 V). The running power supply 3 is maintained in the so-called floating state in which either of the positive and negative electrode sides is connected to the body grounding. Each of the battery units $3a$ to $3f$ includes a plurality of secondary batteries which are capable of being charged by a charge circuit (not shown).

A key switch as shown in FIG. 34 is used for the main switch 2. When the main switch 2 is mounted on an electric motor-vehicle (not shown), a metal made body $2a$ of the main switch 2 is connected to the body grounding.

A voltage V$3a$ of the battery unit $3a$ constituting part of the running power supply 3 is supplied to one terminal $2b$ of the main switch 2 by way of a diode 7 which is connected in the forward direction from the positive electrode side of the battery unit $3a$. The other terminal $2c$ of the main switch 2 is connected to a starting control terminal $4a$, whereby when the main switch 2 is operated in the turn-on state, the voltage V$3a$ of the battery unit $3a$ is supplied to the starting control terminal $4a$ of the DC-DC converter 4 by way of the diode 7 and the main switch 2. Here, the diode 7 has a reverse direction withstand voltage sufficiently higher than the power supply voltage VM of the running power supply 3.

As described above, the power supply unit 1 for an electric motor vehicle gives starting information to the DC-DC converter 4 using the voltage V$3a$ constituting part of the running power supply 3 with a high voltage, so that it becomes possible to use the main switch 2 having a low withstand voltage across the contacts.

Figure 33:
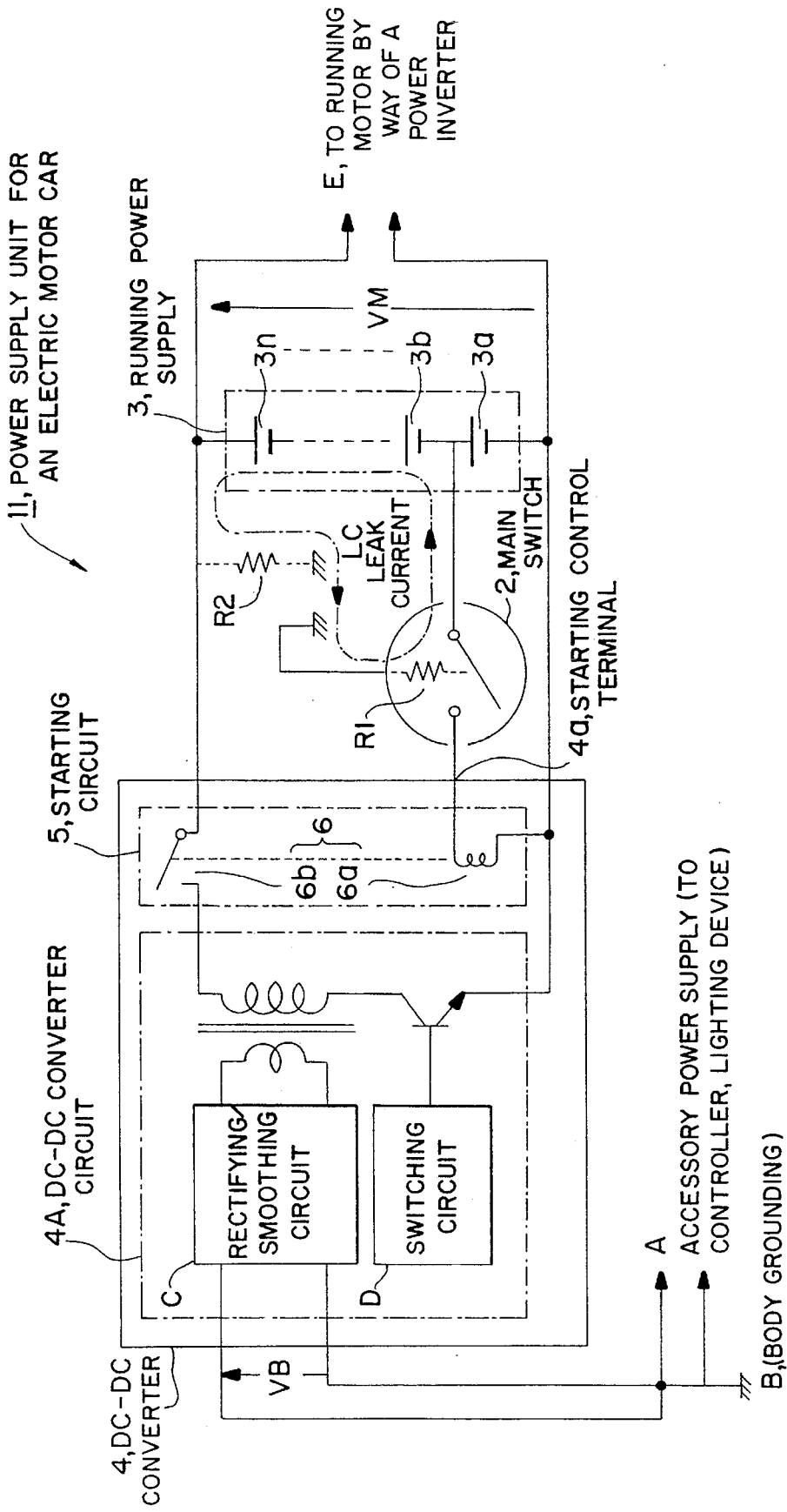
FIG. 33 is a view explaining another prior art power supply unit for an electric motor vehicle and its disadvantage.

Moreover, since the diode 7 is interposed between the main switch 2 and the battery unit $3a$ in such a manner that the anode side of the diode 7 is connected to the positive electrode side of the battery unit $3a$, even when the insulation of the main switch 2 is reduced due to the permeation of water and further leak is generated between the floated running power supply 3 and the body grounding, leak current designated at letters LC in FIG. 33 can be blocked by the diode 7.

In the DC-DC converter 4, the running power supply 3 is inputted between a positive electrode side input terminal $4b$ and a negative electrode side input terminal $4c$, and an accessary power supply having an accessary power supply voltage VB (for example, 13 V) is outputted between a positive electrode side output terminal $4d$ and a negative electrode side output terminal $4e$. The accessary power supply is constituted of a step-down DC-DC converter, down converter, of an input-output insulation type in which the input side and the output side are perfectly insulated, isolated with respect to direct current, from each other.

The DC-DC converter 4 includes a starting circuit 41 for starting the DC-DC conversion on the basis of a starting power or starting signal supplied to the starting control terminal $4a$. A transformer 42 is provided in which a primary winding $42a$ is insulated from a secondary winding $42b$. A switching circuit 43 permits the switching of current flowing the primary winding $42a$. A rectifying/smoothing circuit is provided for rectifying and smoothing an AC voltage induced at the secondary winding $42b$ by interrupting the current flowing the primary winding $42a$. An output voltage control circuit 45 compares a rectified and smoothed output voltage VB with a reference voltage and outputs a pulse width modulated output voltage control signal, PWM signal, $45a$ on the basis of the error between the output voltage VB and the reference voltage. A power supply separating type signal transmission circuit 46 is provided for transmitting the output voltage control signal, PWM signal, outputted from the output voltage control circuit 45 on the side of the switching circuit 43 by way of for example a photocoupler.

In this embodiment, the starting circuit 41 includes a relay 6. When the main switch 2 is turned on to supply the voltage V$3a$ of the battery unit $3a$ to the starting control terminal $4a$ by way of the diode 7, an exiting current is allowed to flow in an exiting winding $6a$ of the relay 6. A contact $6b$ of the relay 6 is thus turned on, and thereby the positive electrode side voltage V$3a$ of the battery unit $3a$ is supplied to the one end side of a primary winding $42a$ of the transformer 42 and a positive electrode side power supply terminal $43a$ of the switching circuit 43. A negative electrode side power supply terminal of the switching circuit 42 is connected to the negative electrode side of the running power supply 3 by way of the negative electrode side terminal $4c$.

Figure 2:
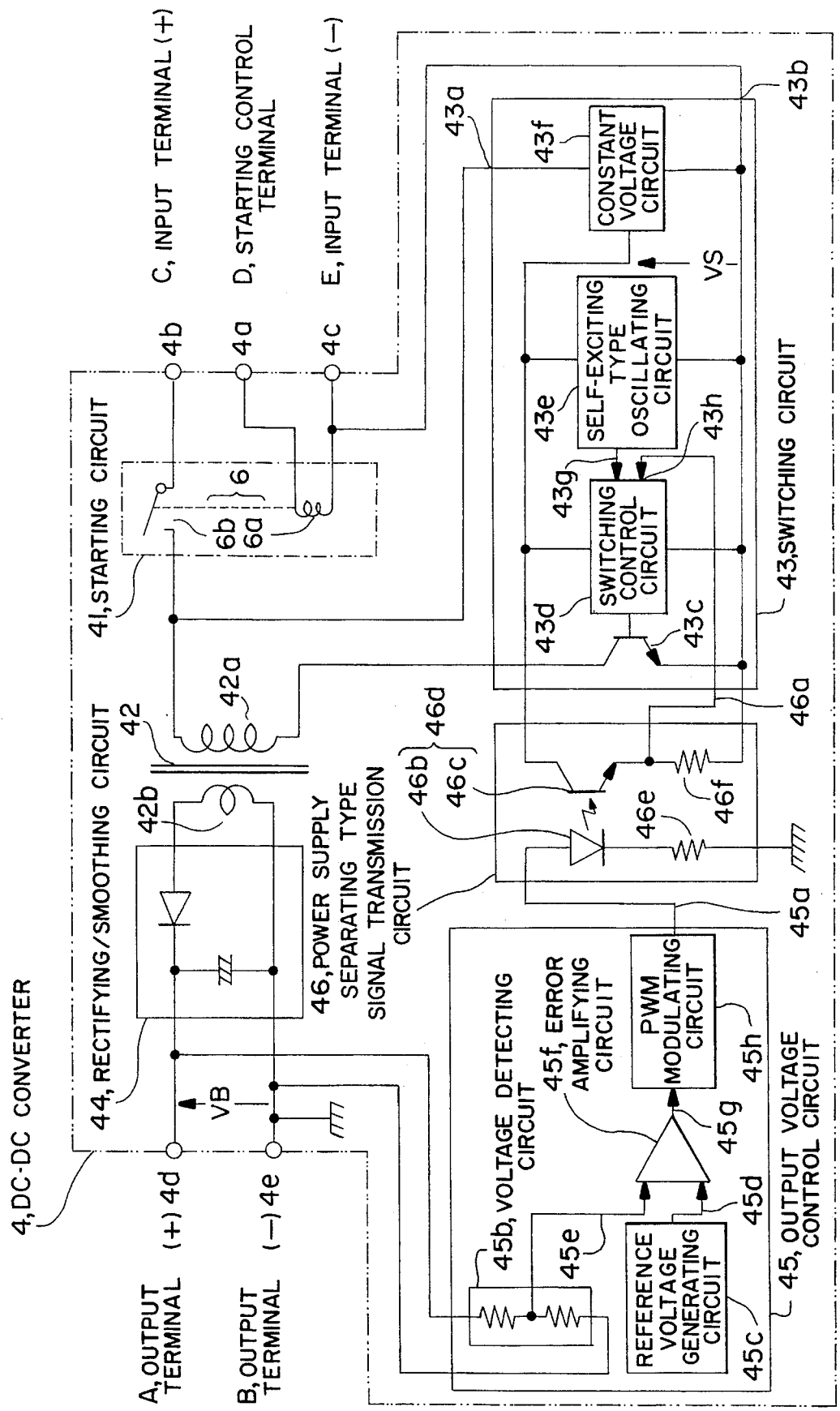
FIG. 2 is a block diagram showing one example of a DC-DC converter.

FIG. 2 is a block diagram showing an example of the DC-DC converter. The switching circuit 43 includes a semiconductor switching element $43c$ such as a transistor interposed between the other end of the primary winding $42a$ of the transformer 42 and the negative electrode side input terminal $4c$. A switching control circuit $43d$ for supplying a signal, for example, base current, to control the current-carrying state of the semiconductor switching element $43c$ is provided. A self-exciting type oscillating circuit $43e$ and a constant voltage circuit $43f$ are provided for supplying a stable power supply VS to these circuits $43d$ and $43e$.

The self-exciting type oscillating circuit $43e$ generates a starting PWM signal $43g$ with a predetermined pulse width and period, and which includes, for example, a multi-vibrator circuit. As for the period and the pulse width of the starting PWM signal $43g$, the duty or the like of the PWM signal is set such that a specified accessary power supply voltage VB can be obtained under the supposed standard loading state, standard loading current, of the accessary power supply VB.

The switching control circuit $43d$ preferentially processes a PWM signal $46a$ which is supplied by way of the power supply separating type signal transmission circuit 46 for adjusting the output voltage. When the PWM signal $46a$ is supplied to an input terminal $43h$, the switching element $43c$ is driven on the basis of the PWM signal $46a$. When it is not supplied, for example, upon starting the DC-DC converter, the switching element $43c$ is driven on the basis of the starting PWM signal $43g$ supplied from the self-exciting oscillating circuit $43e$.

Since the switching element $43a$ is driven on the basis of the starting PWM signal $43g$ generated by the self-exciting oscillating circuit 43e, the DC-DC converter 4 can be certainly started.

Moreover, even when there occurs abnormality in the output voltage control circuit 45 and the power supply separating type signal transmission circuit 46 and thereby the PWM signal 46a for adjusting a voltage is not supplied to the switching control circuit 43d, the operation of the DC-DC converter 4 is continued on the basis of the PWM signal 43g set under the supposed standard loading state, so that it is possible to ensure the accessary power supply VB even if there occurs the above-described abnormality in running.

A monitoring circuit for monitoring the continuity of the PWM signal 46a for adjusting a voltage is provided within the switching control circuit 43d. When the PWM signal 46a within the specified range is not inputted after an elapse of the predetermined monitoring time or more, the generation of the accessary power supply VB is continued using the starting PWM signal 43g generated by the self-exciting oscillating circuit 43e, and simultaneously the alarm may be indicated in a visible or audible manner by drive of a display or a sound-generator (not shown).

The output voltage control circuit 45 includes a voltage detecting circuit 45b for detecting a voltage of the accessary power supply VB outputted from the rectifying/smoothing circuit 44. A reference voltage generating circuit 45c is provided together with an error amplifying circuit 45f for detecting an error between a reference voltage 45d supplied from the reference voltage generating circuit 45c and a detection voltage 45e outputted from the voltage detecting circuit 45b and amplifying the error and a PWM modulating circuit 45h for controlling the current-carrying ratio of the switching element 43a within the switching circuit 43 on the basis of an error signal 45g outputted from the error amplifying circuit 45f and generating a PWM signal 45a for adjusting the output voltage VB.

The power supply separating type signal transmission circuit 46 is adapted to transmit the PWM signal 45a outputted from the output voltage control circuit 45 operated by the accessary power supply VB to the side of the switching circuit 43 operated by the floated running power supply VM. It includes an optically coupled element 46d, for example a photocoupler, having a light emitting element 46b such as a light emitting diode combined with a light receiving element 46c such as a photo-transistor or photo-diode.

A resistance 46e is connected in series to the light emitting element 46b for adjusting a light emitting current; and a load resistance 46f is connected in series to the light receiving element 46c for fetching the PWM signal 46a for adjusting a voltage.

In this power supply separating type signal transmission circuit 46, a pulse signal is transmitted by way of the optically coupled element 46d. Accordingly, as compared with the case where the analog value such as the error voltage is transmitted using the optically coupled element, the output voltage can be certainly adjusted while eliminating the generation of the error in the transmitted information due to the variation in the current transmission efficiency and the temperature characteristic of the optically coupled element.

In this embodiment, using the DC-DC converter 4 of an input-output insulated and switching regulator type, the power supply amount on the input side is controlled such that a specified accessary power supply voltage VB can be obtained even when the load current of the accessary power supply VB is varied. Consequently, power corresponding to the magnitude of the load current of the accessary power supply VB is supplied from the running power supply 3 to the primary side of the DC-DC converter 4. This makes it possible to enhance the efficiency of the DC-DC conversion, and hence to reduce the load of the running power supply 3.

Figure 3:
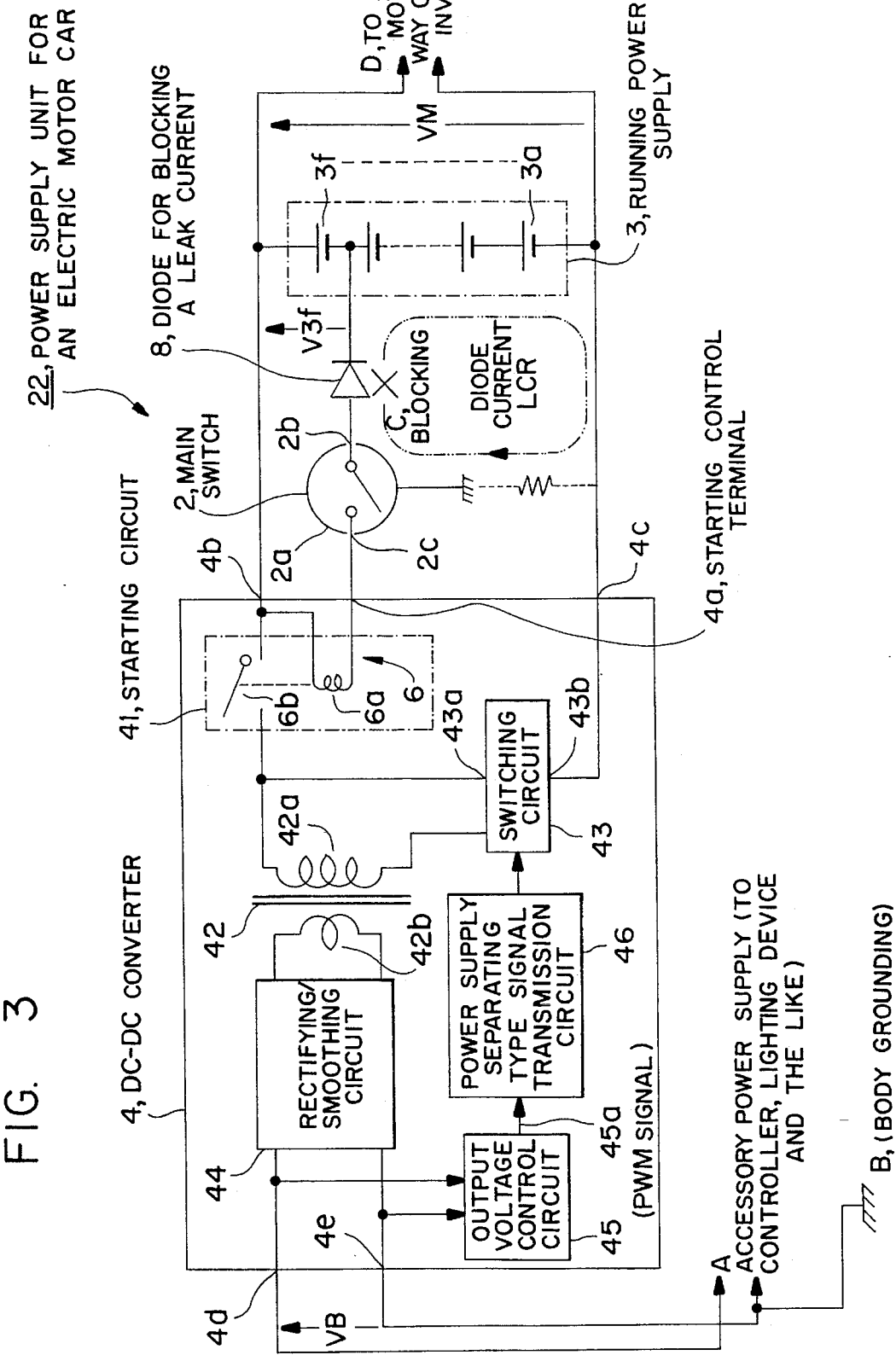
FIG. 3 is a circuit diagram showing another construction of a starting circuit.

FIG. 3 is a circuit diagram of another power supply unit for an electric motor vehicle according to the present invention. A power supply unit 22 for an electric motor vehicle is adapted to drive a relay 6 constituting a starting circuit 41 using a battery unit 3f. A diode for blocking a leak current is interposed between a main switch 2 and a negative electrode side of the battery unit 3f such that the cathode of the diode 8 is connected to the negative side of a battery unit 3n.

Accordingly, even when the insulation between the negative electrode side of the running power supply 3 and the body grounding is reduced, a leak current LCR by way of the main switch 2 is blocked by the diode 8.

Figure 4:
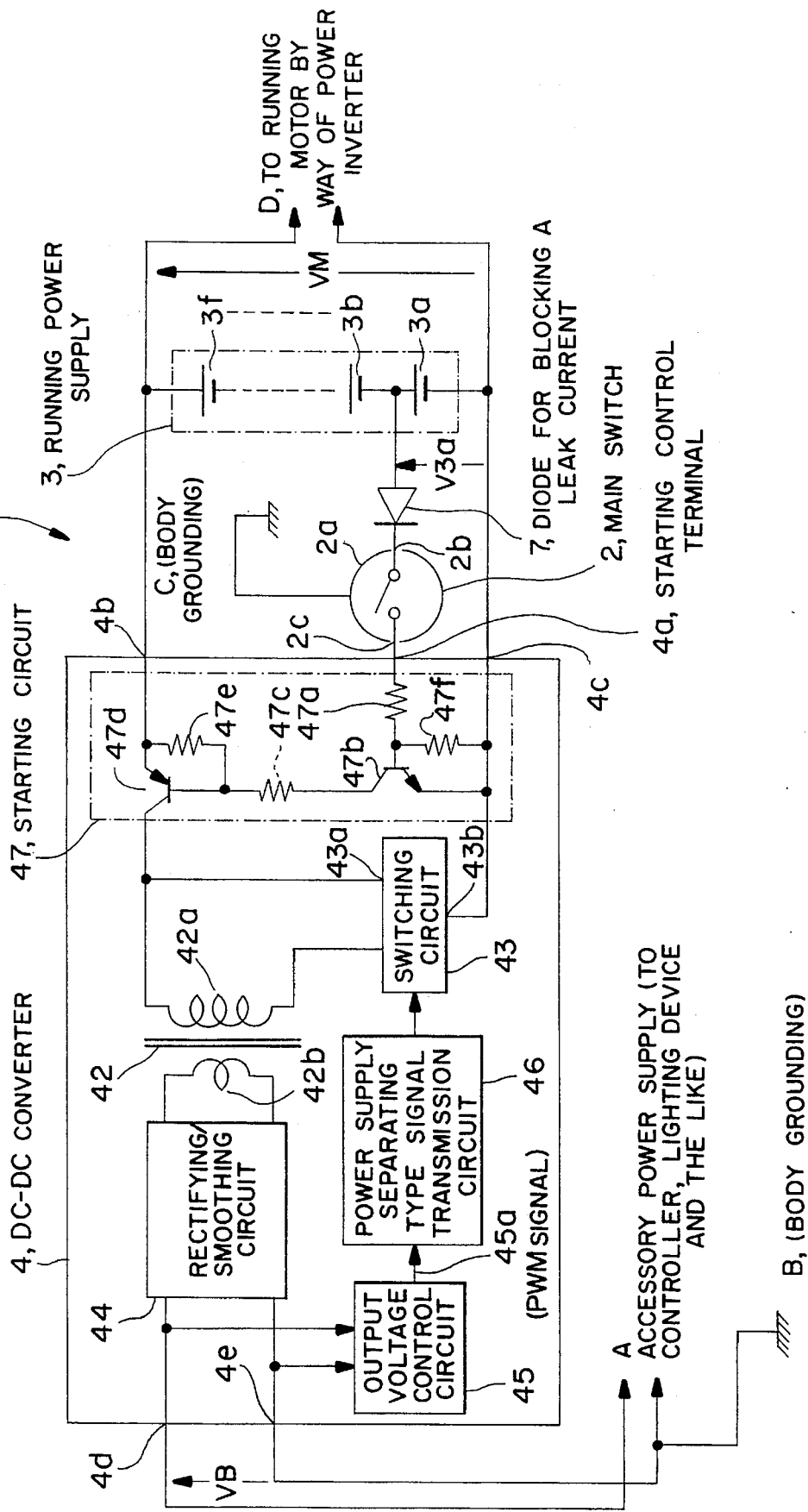
FIG. 4 is a circuit diagram of a power supply unit for an electric motor vehicle using semiconductor switching elements as a starting circuit.

FIG. 4 is a circuit diagram of a power supply unit for an electric motor vehicle in which a starting circuit is constituted of a semiconductor switching element. The starting circuit 47 includes the semiconductor switching element which makes it possible to extremely reduce the current consumed for starting from the battery unit 3a, as compared with the case of driving the relay. Thus, the disadvantage that only the battery unit 3a is discharged earlier than the other battery units 3b to 3f is solved.

Figure 5:
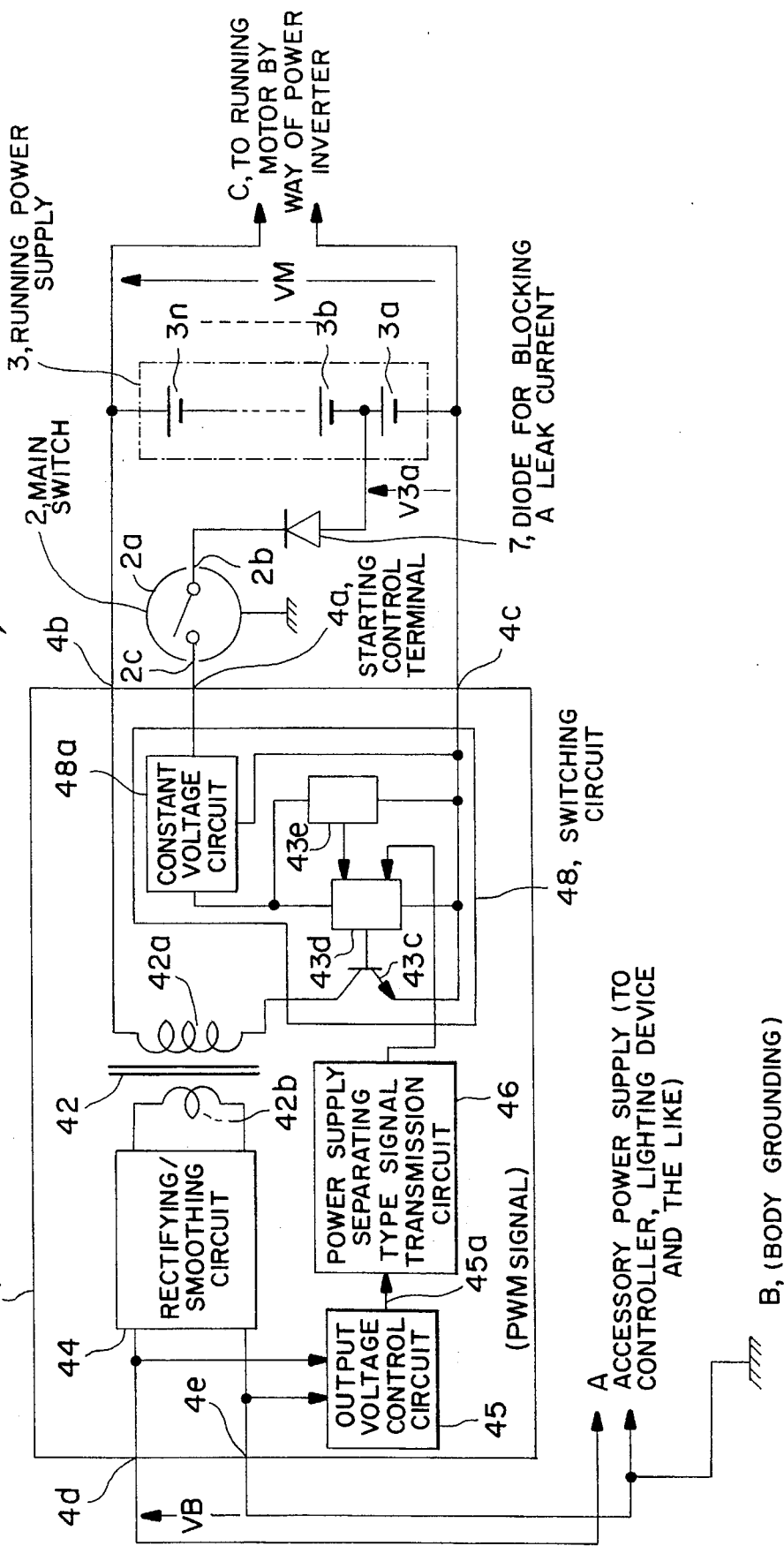
FIG. 5 is a block diagram of a DC-DC converter including a switching circuit serving as a starting circuit.

FIG. 5 is a circuit diagram of a power supply unit for an electric motor vehicle in which a switching circuit within a DC-DC converter serves as the function of a starting circuit.

A power supply unit 24 for an electric motor vehicle includes a constant voltage circuit 48a for receiving a voltage supplied to a starting control terminal 4a and supplying a specified stabilized voltage to a self-exciting oscillating circuit 43e and a switching control circuit 43d and the like which are shown in FIG. 2. When a starting voltage is not supplied to the starting control terminal 4a, a semiconductor switching element 43c is placed in a no-current carrying state and when the starting voltage is supplied thereto, the whole switching circuit is placed in the operable state, thus starting the DC-DC conversion. This makes it possible to eliminate the necessity of provision of a special circuit or the like.

The construction of a circuit of an electric system of an electric motor driven two-wheeled vehicle, to which the power supply unit for an electric motor vehicle of the present invention is applied, will be described below.

Figure 6:
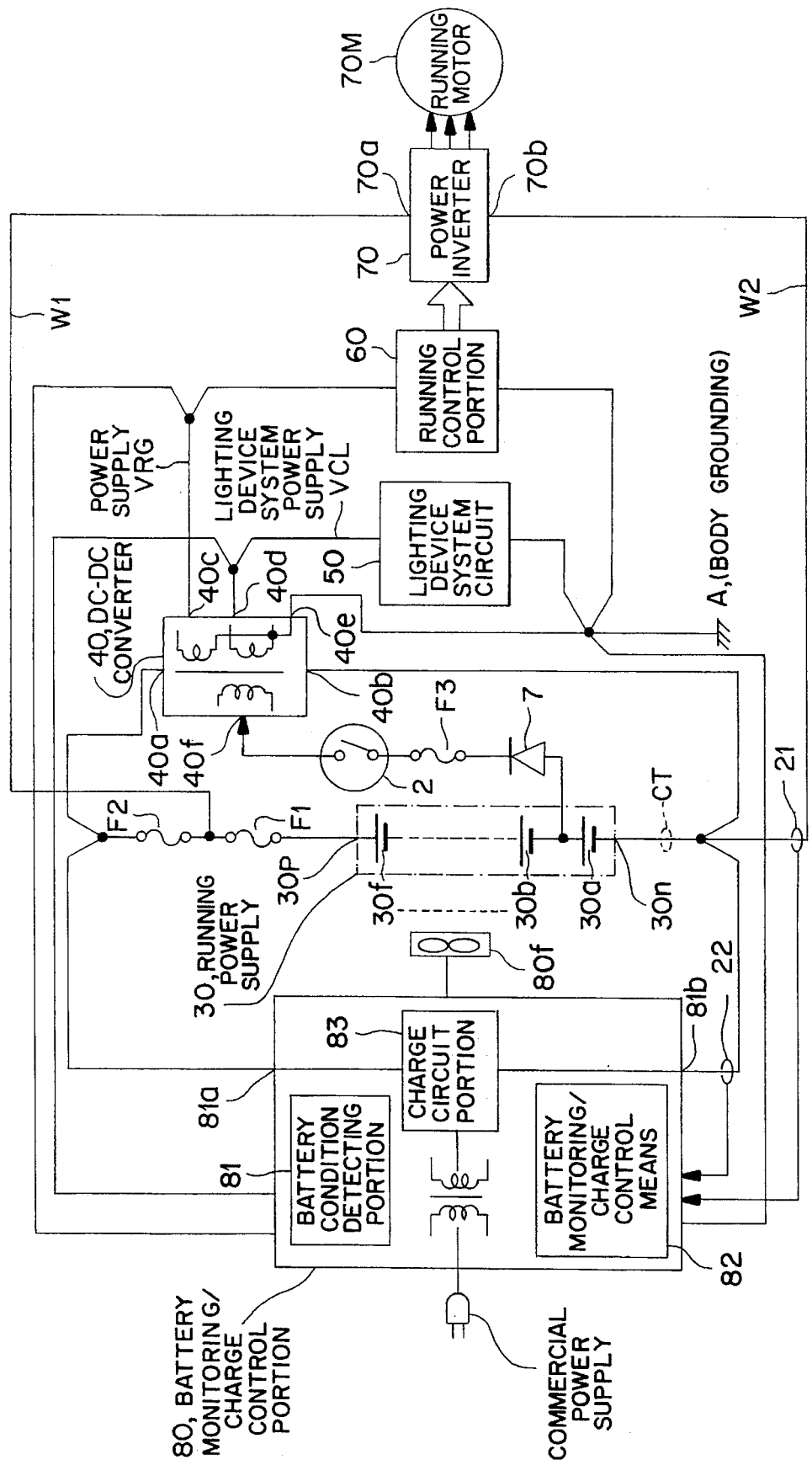
FIG. 6 is a circuit diagram of an electric line of an electric motor driven two-wheeled vehicle to which a power supply unit for an electric motor vehicle according to the present invention is applied.

FIG. 6 is a block diagram showing the whole construction of an electric system of an electric motor driven two-wheeled vehicle. An electric system 20 of an electric motor driven two-wheeled vehicle includes a running power supply 3 maintained in the floating state; a DC-DC converter 40 for producing an accessary power supply; a lighting device system circuit 50; a running control portion 60; a running motor 70M to be driven by power supplied from the running power supply 30 by way of a power inverter 70; a battery monitoring/charge control portion 80 for monitoring the running power supply 30 and controlling the charge of the running power supply 30; a main switch 2, a diode 7 for blocking a leak current; and various fuses F1 to F3.

Current is supplied from a positive electrode side 30P of the running power supply 30 to a power supply terminal 70a on the positive electrode side of the power inverter 70 by way of the fuse F1 with a large current capacity (for example, 50 A) and a positive electrode side feed wire W1 with a low resistance. A power supply terminal 70b on the negative electrode side of the power inverter 70 is connected to a negative electrode side 3ON of the running power supply 30 by way of a negative electrode side feed wire W2 with a low resistance. Moreover, to mainly detect a current supplied to the running motor 70M, a current detector 21 constituted of a magnetic-electric conversion element such as a hole element is provided within the feed path to the power inverter 70.

Voltage on the positive electrode side of the running power supply 30 is supplied to a power supply input terminal 40a on the positive electrode side of the DC-DC converter 40 by way of the fuse F1 with a large current capacity and the fuse F2 with an intermediate current capacity, and a power supply input terminal 40b on the negative electrode side of the DC-DC converter 40 is connected to the negative electrode side 3ON of the running power supply 30.

Two power supplies of a highly accurately stabilized control system power supply VRG and a simplified stabilized lighting device system power supply VCL are inputted in the DC-DC converter 40. A terminal 40c is the output terminal of the control system power supply VRG; a terminal 40d is the output terminal of the lighting device system power supply VCL; and a terminal 40e is the negative side (grounding) output terminal common to the power supplies VRG and VCL. The negative side (grounding) output terminal 40e is connected to the body grounding.

The DC-DC converter 40 is of an input-output insulation type in which the input side is perfectly insulated from the output side with respect to direct current, and which includes a step-down type switching regulator (down converter) for switching a step-down running power supply voltage (for example, 80 to 90 V) supplied across the input side terminals 40a and 40b and obtaining a low output voltage (for example, VRG=13 V, and VLC=11 to 13 V) on the output side by way of an insulated transformer.

In this DC-DC converter, the DC-DC conversion is started at the time when a starting voltage or starting signal is supplied to a starting control terminal 40f.

In this embodiment, a starting voltage or starting signal is supplied, from a battery unit 30a (connected to the negative side 30N) constituting part of the running power supply 30 in which a plurality of battery units 30a to 30f are connected in series to each other, to the starting control terminal 40f by way of the fuse F3 with a small current capacity (for example, 5 A), the diode 7 for blocking a leak current and the main switch 2 in this order.

The lighting device system power supply VCL is supplied to the lighting device system circuit portion 50, while the control system power supply VRG is supplied to the running control portion 60.

These accessary power supplies VCL and VRG are also supplied to the battery monitoring/charge control portion 80. The battery monitoring/charge control portion 80 includes a battery condition detecting portion 81, and a battery monitoring/charge control means 82 for monitoring the running power supply 30 even in the running state. The battery monitoring/charge control portion 80 also includes a charge circuit portion 83 for receiving power from a commercial power supply and supplying a charge current to the running power supply 30.

A fan 8OF for cooling the battery units 30a to 30f, the running power supply 30, is driven by way of the battery monitoring/charge control portion 80.

The running power supply 30 is charged by supplying a charge current from an output terminal 81a on the positive electrode side of a charge circuit portion 83 to an output terminal 81b on the negative electrode side of the charge circuit portion 83 by way of the fuses F2 and F1 and the running power supply 30. A current detector 22 including a magnetic-electric conversion element such as a hole element for detecting a charge current is provided with the above charge current flowing path.

Figure 7:
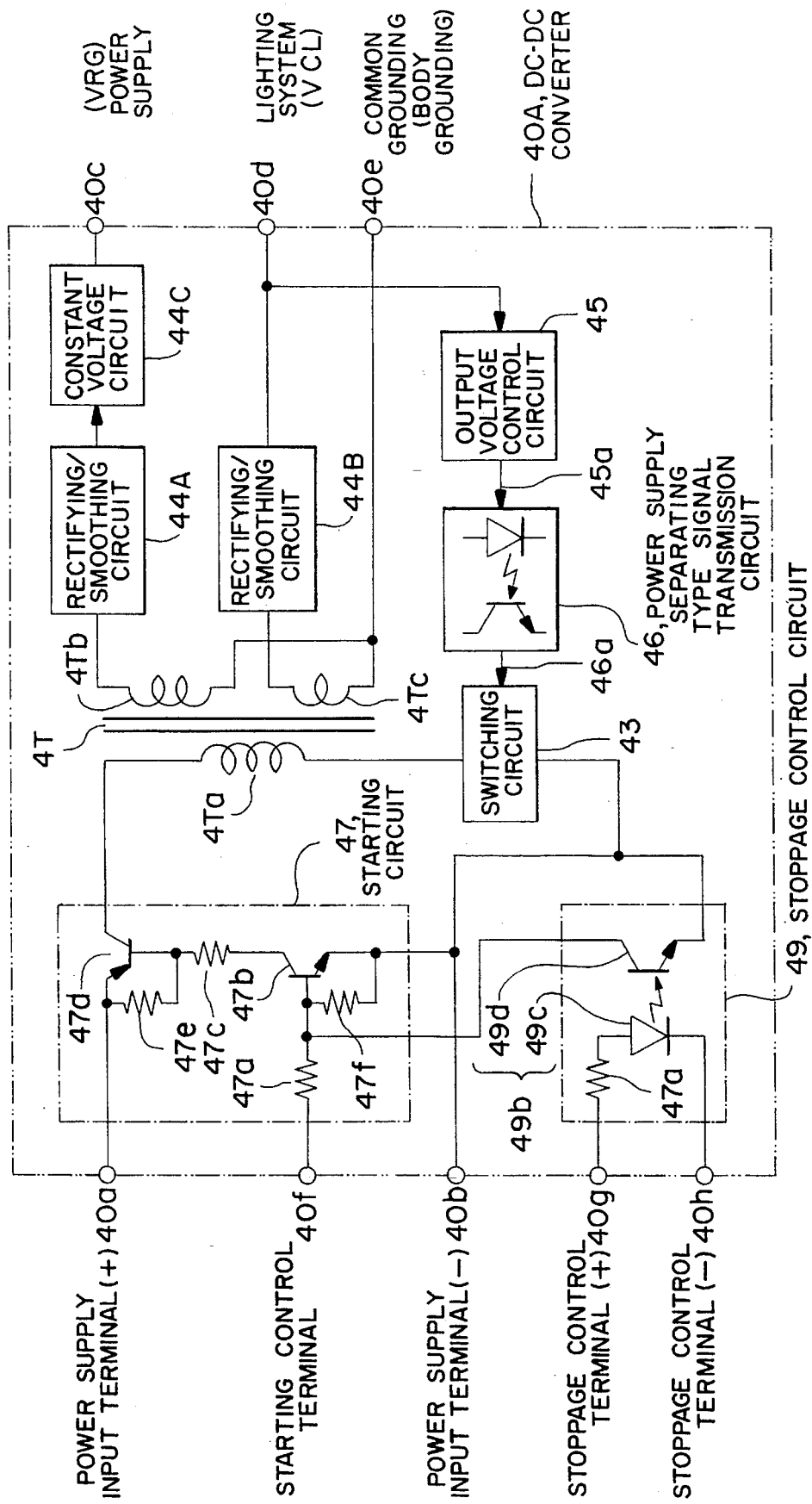
FIG. 7 is a block diagram showing one example of a DC-DC converter for supplying outputs of two lines.

FIG. 7 is a block diagram showing one example of a DC-DC converter for supplying outputs of two lines. A DC-DC converter 40A includes a transformer 4T of a primary side-secondary side insulation type having both secondary windings 4Tb and 4Tc with respect to a common primary winding 4Ta. The AC voltages induced at the secondary windings 4Tb and 4Tc by the switching operation of a switching circuit 43 are rectified and smoothed by rectifying/smoothing circuits 44A and 44B, respectively. The rectifying/smoothing circuit 44A outputs a highly accurately stabilized control system power supply VRG by way of a constant voltage circuit 44C; while the rectifying/smoothing circuit 44B outputs a lighting device system power supply VCL.

An output voltage control circuit 45 monitors the power supply voltage of the lighting device system power supply VCL, and produces and outputs a PWM signal 45a on the basis of an error between the above power supply voltage and a reference voltage. The PWM signal 45a is supplied to the switching circuit 43 by way of a power supply separating type signal transmission circuit 46, to feedback-control the switching operation on the primary winding 4Ta side, thus keeping a specified range of the output voltage, for example 11 to 13 V.

The number of the winding in the secondary winding 4Tb for obtaining the control system power supply VRG is set to be slightly higher than that of the secondary winding 4Tc for obtaining the lighting device system power supply VCL, to obtain a rectified and smoothed output voltage, for example, 16 V or more, slightly higher than that of the lighting device system power supply VCL. A dropper type constant voltage circuit 44C receives the voltage thus obtained and outputs a stabilized voltage, for example, 13 V.

In addition, the low potential sides of the power supplies VRG and VCL, for example, are made to be common, and which are connected to the body grounding.

The DC-DC converter 40A includes a stoppage control circuit 49. The stoppage control circuit 49 is provided to eliminate the fear that, during the charge from a commercial power supply to the running power supply 30, the main switch 2 is operated to give a starting signal to the starting control terminal 40f thereby operating the DC-DC converter 40A. Specifically, for example, a voltage signal regarding the charge which is outputted from the battery monitoring/charge control portion 80 (for example, an output voltage VCH of a charge control DC-DC converter 84 shown in FIG. 11 and a starting inhibiting signal 82d shown in FIG. 11) is supplied to each of stoppage control terminals 40g and 40h, so that a light emitting element 49c of a photocoupler 49b emits light by way of a current restricting resistance 49a and a signal regarding the stoppage is supplied to the starting circuit 47 by way of a light receiving element 49 such as a photo-transistor, thus obstructing the starting command from the main switch 2.

In addition, the stoppage control may be performed by stopping the operation of the switching control circuit 43d within the switching circuit 43 shown in FIG. 2 or stopping the output from the constant voltage circuit 43f.

Figure 8:
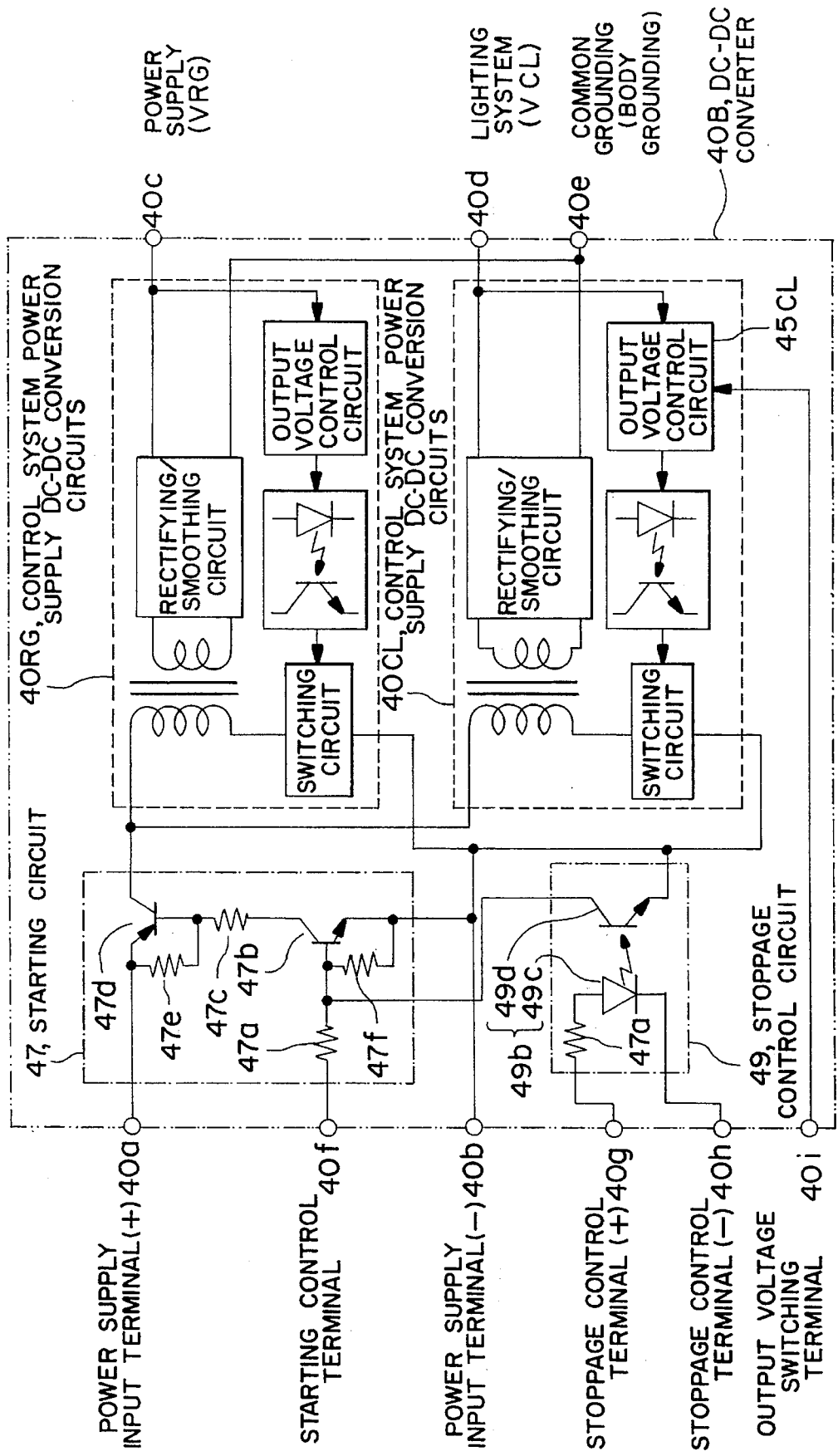
FIG. 8 is a block diagram showing another example of a DC-DC converter for supplying outputs of two lines.

FIG. 8 is a block diagram showing another example of the DC-DC converter for supplying outputs of two lines.

A DC-DC converter 40B is adapted to switch the output voltage of a lighting device system power supply VCL in two stages. For example, in the state when a main switch 2 is turned on but a running motor 70M is not operated, a voltage switching signal (not shown) designating a low output voltage is outputted from the running control portion 60 shown in FIG. 6, and on the basis of this voltage switching signal, the output voltage of the lighting device system power supply VCL is set at for example 11 V, to lower the power consumption of a head lamp or the like described later with reference to FIG. 9, thus suppressing the consumption of the running power supply 30. On the contrary, in the running state when the running motor 70M is operated, a voltage switching signal (not shown) designating a high output voltage is outputted from the running control portion 60, to set the output voltage of the lighting device system power supply VCL at the rating voltage of for example 13 V.

For this purpose, the DC-DC converter 40B includes two DC-DC conversion circuits of a DC-DC conversion circuit 4ORG for a control system and a DC-DC converter 40CL for a lighting device system.

An output voltage control circuit 45CL within the DC-DC converter 40CL for a lighting device system switches the output voltage VCL by switching a reference voltage used for detecting an error of the output voltage according to a voltage switching signal supplied to an output voltage switching terminal 40i.

As the voltage switching signal, there may be used a motor operation permissible signal md (see FIG. 10) described later.

Figure 9:
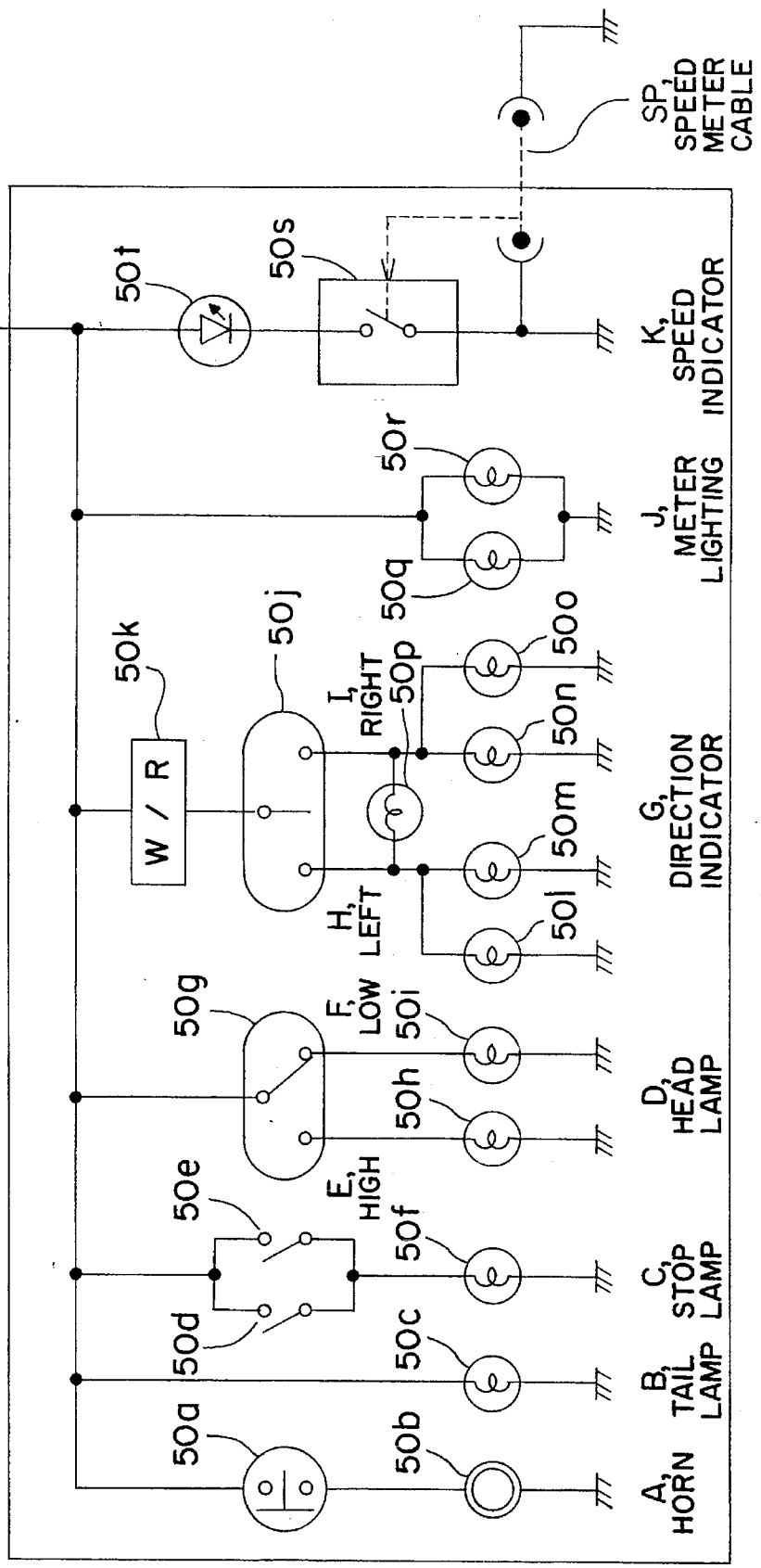
FIG. 9 is a circuit diagram showing one example of a lighting device system circuit portion.

FIG. 9 is a circuit diagram showing one example of a lighting device system circuit portion. A lighting device system circuit portion 50 includes a horn 50b actuated by the operation of a horn switch 50a; a tail lamp 50c; a stop lamp 50f connected in series to switches 50d and 50e closed by a braking operation; a high beam head lamp 50h and a low beam head lamp 50i lighted by way of a beam switch 50g; indicator lamps 50 to 50p driven by a winker timer 50k on the basis of the operation of a winker switch 50j; meter lighting lamps 50q and 50r; and an over speed indicating light emitting diode 50t lighted by way of a switch 50s which is turned on when a vehicular speed detected by way of a speed meter cable SP exceeds a specified value.

When a main switch 2 is operated and a lighting device system power supply VCL is raised, the tail lamp 50c, either of the head lamps 50h and 50i, and the meter lighting lamps 50q and 50r are usually lighted.

When the winker switch 50j is switched, for example, from the neutral position to the right side, the blinker lamps 50n and 50o on the right side are illuminated, and the indicator lamp 50p for indicating the blinker operation is illuminated. At this time, current also flows to the blinker lamps 50l and 50m on the left side by way of the indicator lamp 50p. However, since the indicator lamp 50p consumes a small amount of power (for example, 3 or 4 W) and high in resistance, the voltage generated at both ends of each of the blinker lamps 50l and 50m (consumptive power: 10 W) is low, and thereby the blinker lamps 50l and 50m are not illuminated. Similarly, when the blinker switch 50j is switched to the left side, the blinker lamps 50l and 50m and the indicator lamp 50p are illuminated, but the blinker lamps 50n and 50o are not illuminated.

Figure 10:
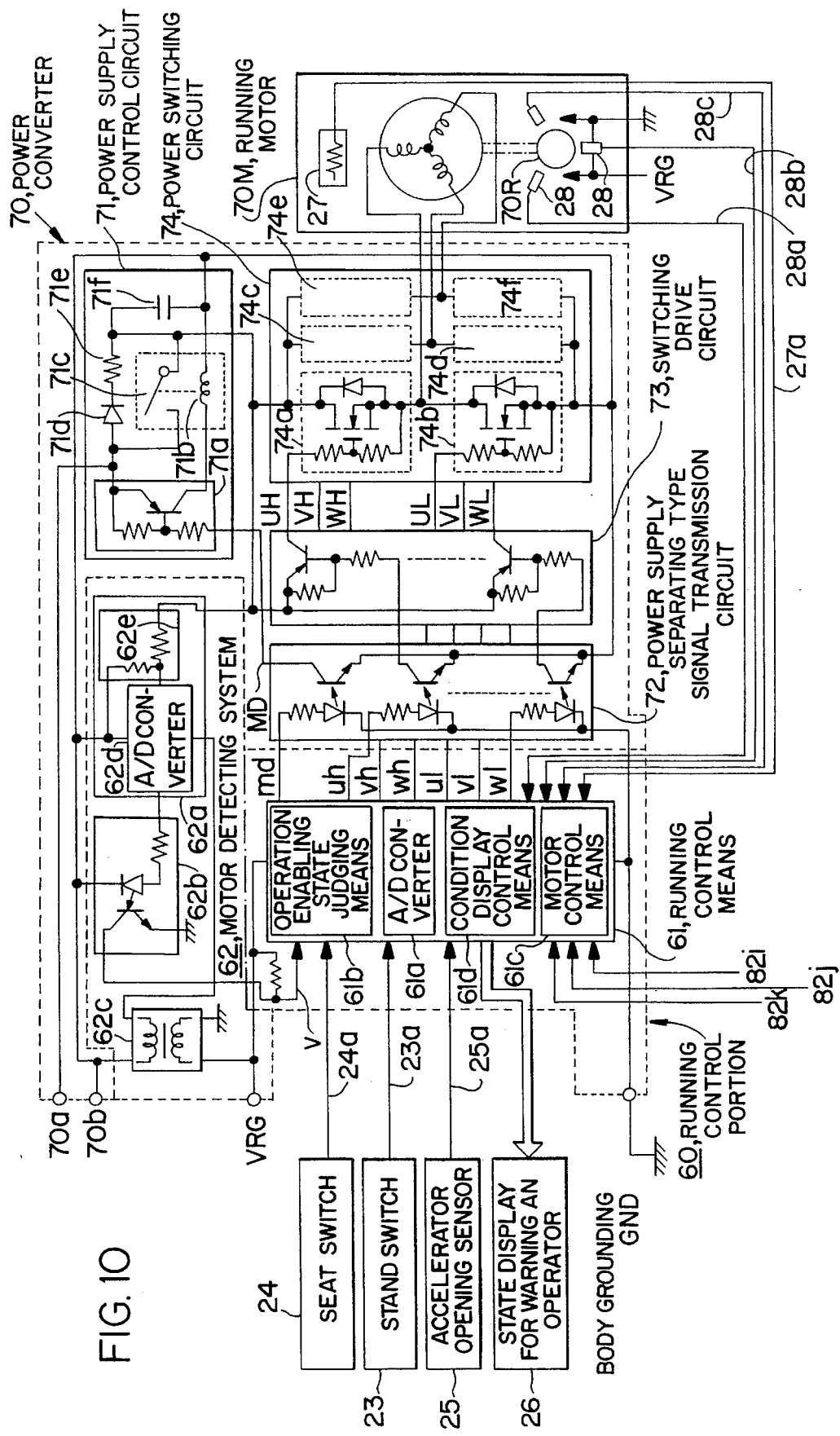
FIG. 10 is a block diagram showing one example of a running power supply and a power inverter.

FIG. 10 is a block diagram showing one example of a running control portion and a power inverter. A running control portion 60 includes a running control means 61, and a motor voltage detecting system 62 for detecting an actual voltage applied to a power inverter 70.

The running control means 61 includes an A/D converter 61a contained in a one chip micro-computer; and an operation enabling state judging means 61b, a motor control means 61c and a condition display control means 61d which are operated on the basis of a control program previously contained in a ROM.

On the basis of the on-off information 23a of a stand switch 23, the operation enabling state judging means 61a confirms that a side stand of an electric motor driven two-wheeled vehicle is contained and on the basis of the on-off information 24a of a seat switch 24, it confirms that an operator is in the seated state. When a signal 25a regarding an accelerator opening indicates the opening of an accelerator less than a specified value, the operation enabling state judging means 61a outputs a motor operation enabling signal md. When the non-seated state in the operation condition is continued for a predetermined time, the operation enabling state judging means 61a stops the output of the motor operation enabling signal md.

When a motor operation stoppage command signal 82j is supplied from a battery monitoring/charge control portion 80 by the temperature rise and the reduction in the battery capacity in the running power supply 30, the operation enabling state judging means 61a stops the output of the motor operation enabling signal md.

An accelerator opening sensor 25 includes a variable resistor (volume) turned on the basis of the operation of the accelerator. A reference potential is applied across both ends of the variable resistor, and the voltage signal 25a regarding an accelerator opening is outputted from the movable terminal. The running control means 61 can obtain a digital signal corresponding to the voltage signal 25a regarding an accelerator opening by way of the A/D converter 61a.

When a voltage supplied to a power switching circuit 74 is out of a predetermined allowable range, on the basis of the information (v) regarding a supply voltage to a power switching circuit 74 detected by the motor detecting system 62, the operation enabling state judging means 61a stops the output of the motor operation enabling signal md for stopping the operation of the running motor 70M as needed; or supplying a signal indicating the abnormal voltage to the state display control means 61d while allowing the operation of the running motor 70M to be continued, thereby driving a visible display or audible display provided in the state display 26 for warning an operator.

Moreover, the operation enabling state judging means 61a monitors the temperature of the running motor 70M. When the motor temperature is out of a predetermined allowable range, the operation enabling state judging means 61a gives a command to the motor control means 61c for reducing the motor output, stopping the operation of the motor as needed, or giving a signal to the state display control means 61d such that the abnormal motor temperature is indicated by lighting of the light emitting diode or the like in the state display 26.

For this purpose, the running motor 70M includes a temperature sensor 27 using a thermally-sensitive resistance element such as a thermistor. For example, a control system power supply VRG is supplied to a series circuit between a fixed resistance (not shown) and the temperature sensor 27, thermally-sensitive resistance element, so that a voltage regarding the detection temperature generated at the end of the temperature sensor, thermally-sensitive resistance element, 27 is incorporated by way of the A/D converter 61a.

The state display control means 61d visibly indicates, by lighting of respective light emitting diodes or the like provided in the state display 26, that the main switch 2 is tuned on, the side stand 23 is contained, an operator is in the seated state, and the running motor 70M is operable.

A plural sets (for example, 3 sets) of magnetic-electric conversion elements such as hole elements and magnetic sensors 28 for amplifying and shaping the outputs of the magnetic-electric conversion elements thereby outputting a binary signal are provided in the running motor 70M with equal intervals for detecting the mechanical rotational position of a rotor 70R. The control system power supply VRG is supplied to each magnetic sensor 28. In a motor of a type in which the rotor 70R is formed of a permanent magnet, the position of the rotor may be detected by measurement of the magnetic field of the permanent magnet by means of each magnetic sensor 28. Moreover, a magnet (not shown) for detecting the rotational position may be provided on a rotational output shaft for detecting the magnetic field.

The motor control means 61c judges the mechanical rotational position of the rotor 70R on the basis of outputs 28a, 28b and 28c of the magnetic sensors 28 for determining the current-carrying timing from the motor 70M to each winding. Moreover, it outputs current-carrying command signals uh, vh, wh, ul, vl and wl pulse width-modulated according to the opening of the accelerator for adjusting the output from the running motor 70M.

When a motor output reducing command signal 82i is supplied from the battery monitoring/charge control means 80 by the reduction in the remaining capacity and the temperature rise in the running power supply 30, the motor control means 61c reduces the supply of power to the running motor 70M.

The electric motor driven two-wheeled vehicle includes a regenerative braking function. At the time of regenerative braking, the motor control means 61c stops the outputs of current-carrying command signals uh, vh, wh, ul, vl and wl and rectifying an AC voltage induced in each winding of the running motor 70M by the power switching circuit 74 for charging the running power supply 30. Thus, a load is given to the output of the power generation of the running motor 70M acting as a generator, thus effectively achieving the regenerative braking. In addition, when a regenerative braking enabling signal 82k is not given from a battery monitoring/charge control means 82 described later, the motor control means 61c does not perform the regenerative braking.

Moreover, the regenerative braking may be performed by controlling the switching operation of each of semiconductor power switching elements 74a to 74f within the power switching circuit 74 such that the induced voltage generated between the specified phases of the running motor 70M acting as a generator is used for the winding of the other phase, without charging the running power supply 30. When the regenerative braking is thus performed for the winding of the other phase or a resistor for a large power consumption separately provided, it is not restricted by the condition of the running power supply 30.

The control of the regenerative braking may be manually performed on the basis of a regenerative braking switch (not shown), and further, may be automatically performed when the state where a voltage detected by the motor voltage detecting system 62 exceeds the power supply voltage of the running power supply 30 is continued for a specified period of time or more.

The motor voltage detecting system 62 includes a motor voltage detecting portion 62a, a power supply separating type signal transmission circuit 62b, and a DC-DC converter 62c.

The motor voltage detecting portion 62a includes an A/D converter 62d, and a resistance type voltage divider 62e for dividing a voltage on the high voltage side of the power switching circuit 74 in the voltage range capable of being processed in the A/D converter 62d.

The DC-DC converter 62c is of a type in which the input side is insulated from the output side with respect to direct current. It receives a control system power supply VRG and outputs a power supply required for operation of the A/D converter 62d.

A digital signal regarding the detection voltage subjected to AD conversion is transmitted to the running control means 61 by way of the power supply separating type signal transmission circuit 62b constituted of a photocoupler or the like. When an A/D converter of a plural bits parallel output type is used, photocouplers in the number corresponding to that of the parallel bits are provided in the power supply separating type signal transmission circuit 62b. When an A/D converter of a bit serial output type for performing the series-parallel conversion on the running control means 61 side, the power supply separating type signal transmission circuit 62b can be one photocoupler.

When a power supply for operating the A/D converter 62d is obtained by the running power supply 30, the DC-DC converter 62c is not required to be provided. In this case, a power supply switch circuit operated on the basis of the motor operation enabling signal md is provided such that a power supply is not supplied from the running power supply 30 to the A/D converter 62d.

The power inverter 70 includes a power supply control circuit 71, the power supply separating type signal transmission circuit 72, a switching drive circuit 73 and the power switching circuit 74.

The power supply control circuit 71 makes a semiconductor switching element 71a in the current-carrying state on the basis of the motor operation enabling signal md supplied by way of the power supply separating type signal transmission circuit 72, to supply current to a winding 71b of the relay, thereby turning on a contact 71c of the relay, so that a power supply voltage on the positive electrode side of the running power supply 30 applied to a terminal 70a is directly supplied to the power switching circuit 74 and the like.

Moreover, a series circuit between a diode 71d and a current restrictive resistance 71e is connected in parallel to the contact 71c of the relay, so that even when the contact 71c of the relay is turned off, a power supply stabilizing capacitor 72f is charged in the state that a current is restrictive by a current restrictive resistance 72e. Since the current restrictive resistance 72e is provided, when the running power supply 30 is connected to the power inverter 70, an excessive initial charging current is not allowed to flow to the power supply stabilizing capacitor 72f. Moreover, since the diode 71d is interposed, even when the terminal 70a is short-circuited to the terminal 70b in the state that a connector provided between the running power supply 30 and the power inverter 70 is removed for checking and maintenance, an electric charge stored in the power supply stabilizing capacitor 71f is not discharged. Accordingly, if an operator touches the terminal 70a during checking or maintenance, he/she does not suffer any electric shock.

The power supply separating type signal transmission circuit 72 transmits various signals md, uh, vh, wh, ul, vl, and wl outputted from the running control means 61 operated by a control system power supply VRG to a circuit portion operated by the floated running power supply 30, by means of the photo-coupling composed of light emitting elements combined with light receiving elements. In this embodiment, the power supply separating type signal transmission circuit 72 is provided on the side of the power inverter 70. However, it may be provided on the side of the running control portion 60. Moreover, the light emitting elements may be provided on the side of the running control portion 60, while the light receiving elements may be provided on the side of the power inverter 70. At this time, the light emitting elements and light receiving elements are respectively connected to each other by means of light introducing paths using optical fibers or the like so as to sufficiently separate the distance of the high voltage circuit side from that of the low voltage circuit side, to improve the insulating performance, and to prevent the switching noise generated at the power switching circuit 74 from entering the running control means 61.

The switching drive circuit 73 outputs various signals UH, VH, WH, UL, VL and WL for driving various semiconductor power switching elements 74a to 74f within the power switching circuit 74 on the basis of various current-carrying signals uh, vh, wh, ul, vl and wl supplied by way of the power supply separating type signal transmission circuit 72.

The power switching circuit 74 includes six pieces of the semiconductor power switching elements 74a to 74f of three-phase bridge connection. Diode for absorbing reversed surge are connected in parallel to the semiconductor power switching elements 74a to 74f, respectively. In addition, there may be used a semiconductor power switching element containing reversely connected diode. The switching elements 74a to 74f are protected from the reversed surge generated by the switching operation by the diodes. Moreover, at the time of regenerative braking, the voltage having the same polarity is supplied to the side of the running power supply 30 by way of these diodes.

In addition, each of the semiconductor power switching elements 74a to 74f may include a plurality of semiconductor switching elements for a small or intermediate power connected in parallel to each other for ensuring a necessary power loss capacity.

Moreover, in the application example to a motorcycle described later, the power switching circuit 74 and the power supply control circuit 71 are provided on the side of the running motor 70M, to shorten the length of the wiring of a large current path for supplying a motor drive current.

Figure 11:
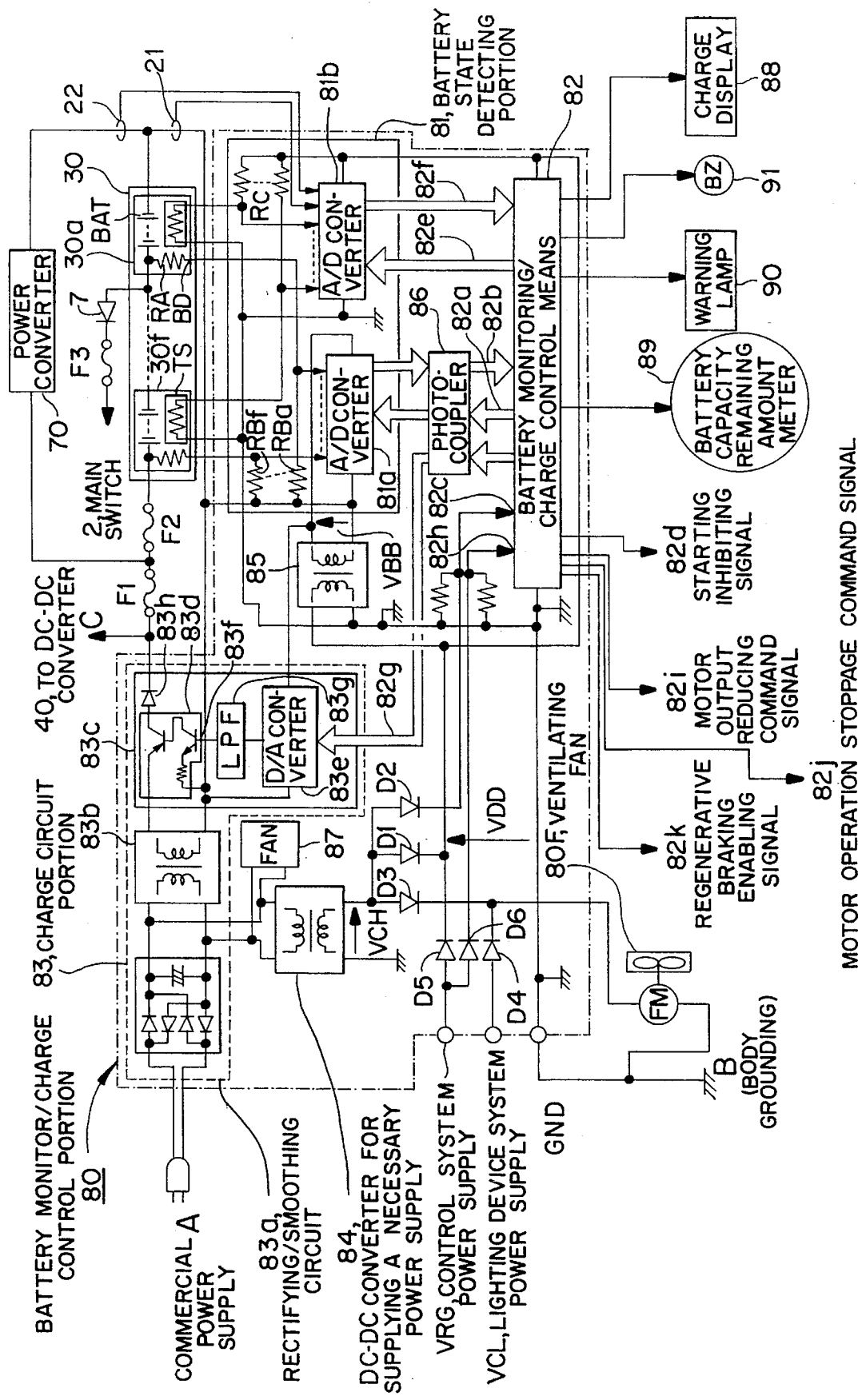
FIG. 11 is a block diagram showing one example of a battery monitoring/charge control portion.

FIG. 11 is a block diagram showing one example of a battery monitoring/charge control portion. A battery monitoring/charge control portion 80 includes a battery state detecting portion 81; a battery monitoring/charge control means 82 includes a microcomputer or the like; a charge circuit portion 83; a DC-DC converter 84 for supplying a necessary power supply to each circuit at the time of charging; a DC-DC converter 85 for supplying a power supply for detecting a battery voltage; a power supply separating type signal transmission circuit 86 includes a photocoupler or the like; and a fan 87 for escaping the heat generated at the charge circuit portion 83 or the like to the outside for forcibly cooling the battery monitoring/charge control portion 80.

The running power supply 30 includes a plurality (for example, six) battery units 30a to 30f connected in series to each other. Each of the battery units 30a to 30f includes a plurality (for example, 12) secondary batteries BAT connected in series to each other, a resistance RA for restricting an output current from a voltage detection terminal BD, and a temperature detector TS for detecting the temperature of the battery unit which is constituted of a thermally-sensitive resistance element such as a thermistor or the like.

The resistance RA for restricting a current is interposed between the positive electrode side of the battery unit and the voltage detecting terminal BD. The resistance RA contained in the battery unit makes it possible to prevent the flow of the excessive current even when there occurs an abnormality, for example, on the side of the voltage detecting portion 81. In addition, the resistance values of the resistances RA are made to be equal to each other, to be common to all of the battery units 30a to 30f.

The battery state detecting portion 81 includes an A/D converter 81a for converting a voltage divided both in the current restrictive resistance RA of each of the battery units 30a and 30f and each voltage dividing circuit constituted of each of voltage dividing resistances RBa to RBf into the corresponding digital signal; and an A/D converter 81b for converting an output voltage of a temperature detecting circuit constituted of a series circuit between each reference resistance RC and a temperature detector TS for each of the battery units 30a to 30f into the corresponding digital signal, and converting a voltage signal regarding a current value detected at each of current detectors 21 and 22 into the corresponding digital signal.

A specified power supply voltage VBB is supplied to the A/D converter 81a for converting the voltage of the battery by way of an input-output insulation type DC-DC converter 85. The negative electrode side of the power supply VBB is connected to the negative electrode side of the running power supply 30.

In place of the provision of the input-output insulation type DC-DC converter 85, a power supply may be supplied from the running power supply 30 to the A/D converter 81a by way of a step-down type stabilizing power supply circuit (not shown). However, when the running power supply 30 becomes close to the perfect discharge state, the operation of the A/D converter 81a cannot be assured, which makes it impossible to detect the voltage of each of the battery units 30a to 30f. For this reason, in this embodiment, a voltage VDD obtained from the charge circuit portion 83 operated by power supplied from the commercial power supply by way of, for example the DC-DC converter 84 for controlling the charge and a diode D1 is supplied to the input side of the input-output insulation type DC-DC converter 85, and the A/D converter 81a is operated by the output voltage VBB, thus detecting the voltage of each battery unit irrespective of the power supply voltage of the running power supply 30.

In the A/D converter 81a, the range of the input voltage capable of being A/D converted is restricted, so that the resistance value of each of the voltage dividing resistances TBa to RBf is set such that a voltage divided in the current restrictive resistance RA and each of the voltage dividing resistances RBa to RBf is in the specified input voltage range.

The voltage dividing resistances RBa to RBn may be equal to each other. However, in this case, the divided voltage is proportional to the series connection voltage of the battery units 30a to 30f. Accordingly, when the voltages of the battery units 30a to 30f are equal to each other, the maximum value of the divided voltage, detection voltage of the whole running power supply, becomes six times as much as the minimum value of the divided voltage, detection voltage of the battery unit 30a. This causes an inconvenience that the detection discrimination for the minimum value is reduced, or when the maximum value exceeds the allowable input voltage range due to the excessive charge or the voltage rise at the time of the regenerative braking, the accurate voltage detection output cannot be obtained.

To cope with the above problem, the resistance values of the voltage dividing resistances RBa to RBf are set such that each divided voltage is located at the position near the center of the allowable input voltage range for ensuring the discrimination of the voltage detection, and preventing the detection impossible state due to the voltage rise. In this case, a voltage judging means (not shown) in the battery monitoring/charge control means 82 must convert the detection voltage on the basis of the divided ratio for each voltage dividing circuit.

To detect the battery voltage of the floated running power supply 30, the power supply of the A/D converter 81a for detecting a voltage is floated by way of the DC-DC converter 85, so that the signal between the A/D converter 81a and the battery monitoring/charge control means 82 is transmitted by way of the power supply separating type signal transmission circuit 86.

To detect voltages of a plurality of battery units, the A/D converter 81a is constituted of a multiplex input type. The battery monitoring/charge control means 82 supplies information 82a of, for example parallel three bits regarding the designation of the input channel to the side of the A/D converter 81a by way of the power supply separating type signal transmission 86; and receives information 82b of, for example parallel eight bits regarding the result of the A/D conversion of the designated input channel by way of the power supply separating type signal transmission circuit 86. Accordingly, a plurality, for example 11, photocouplers are required for interface with the A/D converter 81a in the power supply separating type signal transmission circuit 86.

The A/D converter 81a sample-holds each input voltage in the predetermined order for A/D conversion. The data of, for example eight bits which is A/D converted from the data of, for example three bits regarding the selected input channel is inserted between the predetermined start code and stop code, to be outputted in bit series. This is sequentially repeated for each input channel. Thus, the information regarding the input channel, kind of a battery unit, and the information regarding the detection voltage may be performed by one photocoupler.

The charge circuit portion 83 includes a rectifying/smoothing circuit 83a for rectifying the commercial power supply and outputting the smoothed direct current; and an input-output insulation type DC-DC converter 83b for receiving the rectified and smoothed output and supplying a charging voltage into a constant current circuit 83c of a current variable type.

The constant current circuit 83c of a current variable type includes a voltage control type constant current circuit 83d, and a low pass filter circuit (LPF) 83g for absorbing the rapid change in an output voltage of a D/A converter 83e and supplying a control voltage to a control voltage input terminal 83f of the voltage control type constant current circuit 83d. The floated power supply VBB is supplied to the D/A converter 83e by way of the input-output insulation type DC-DC converter 85. Moreover, a diode 83h for preventing a voltage from being applied from the running power supply 30 to the voltage control type constant current circuit 83d is provided in the constant current circuit 83c of a current variable type.

When the commercial power is supplied for charging, the DC-DC converter 84 for controlling the charging is operated by the output voltage of the rectifying/smoothing circuit 83a, and a voltage VCH higher than a control system power supply VRG by the forward step-down voltage of the diode is outputted on the output side of the DC-DC converter 84. The voltage VCH is supplied to the battery monitoring/charge control means 82 and the input side of the DC-DC converter 85 for supplying the floated power supply VBB by way of the diode D1.

The battery monitoring/charge control means 82 judges the charge state where the commercial power supply is connected, on the basis of the fact that a voltage more than the threshold value is applied to a charge control terminal 82c by way of, for example a diode D2, and outputs a signal 82d for inhibiting the starting of the DC-DC converter 40 for supplying the control system power supply VRG and the lighting device system power supply VCL, thus controlling the DC-DC converter 40 in the nonoperable state.

For the DC-DC converters 40A and 40B shown in FIGS. 7 and 8, each of which is provided with a starting circuit 47 having a stoppage control function, the DC-DC converters 40A and 40B are made in the non-operable state by supplying the starting inhibiting signal 82d to the stoppage control terminal 40g. Thus, when the main switch 2 is operated in such a state that the commercial power supply is connected, it is prevented that the DC-DC converter 40 shown in FIG. 6 is started and the circuits other than the running power supply 30 are loaded to the charge circuit portion 83.

In addition, a relay (not shown) may be operated on the basis of the starting inhibiting signal 82d, to prevent the starting signal to be supplied to the starting control terminal 40f of the DC-DC converter 40 shown in FIG. 6 by way of the contact of the relay.

The battery monitoring/charge control means 82, which judges the charge state, starts the DC-DC converter 81a for detecting the battery voltage, by way of the power supply separating type signal transmission circuit 86, to obtain the digital information 82b regarding the voltage of each battery unit; and outputs the information 82e regarding the designation of the input channel to start the A/D converter 81b for detecting the battery temperature and current, to obtain the digital information 82f regarding the temperature of each battery and a charging current detected by the current detector 21.

When the voltage of each battery unit is lower than the rating voltage by a specified value or more, the battery monitoring/charge control means 82 supplies the information 82g regarding the current value for rapid charging to the D/A converter 83e in the constant current circuit 83c of a variable current type by way of the power supply separating type signal transmission circuit 86. The D/C converter 83e outputs a voltage corresponding to the supplied information 82g regarding the current value. This output voltage is supplied to the voltage control type constant current circuit 83d by way of the low pass filter 83f, and the charging current corresponding to the current value designating information 82g is supplied to the running power supply 30 by way of the diode 83h. The battery monitoring/charge control means 82 monitors the charging current on the basis of the digital information 82f regarding the charging current detected by the current detector 21, to feedback-control the information 82g regarding the current value to obtain a specified current value.

The voltage of each of the battery units 30a to 30f reaches or becomes close to the rating voltage, the battery monitoring/charge control means 82 outputs the information 82g regarding the current value for usual charging, to continue the charging with a relatively small charging current until an elapse of the predetermined period of time, thus perfectly charging each battery unit. After the usual charging is continued for a specified period of time, the battery monitoring/charge control means 82 outputs the information 82g for stopping the voltage output of the D/A converter 83e, thus stopping the current supplying operation of the voltage control type constant current circuit 83d.

Since the voltages of the battery units 30a to 30f are individually detected, the charging can be continued until all of the battery units are perfectly charged.

In addition, the battery monitoring/charge control means 82 illuminates the light emitting diode or the like in the charge display 88 during the charging, to visually indicates the charging state and also visually indicates the progress of the charging by drive of a battery capacity remaining amount meter 89.

In this embodiment, the voltage and the temperature are detected for each battery unit. Accordingly, it is possible to visually or audibly indicate the abnormal state for each battery.

The number of the battery units 30a to 30f may be visually indicated by the continuous lighting number of the charge display 88 without provision of any special display, or the content of the abnormal voltage and abnormal temperature may be indicated by changing the frequency or interrupted period of the sound of a buzzer 91.

When the commercial power supply is connected, the voltage VCH outputted from the DC-DC converter 84 for charging is supplied to a DC motor FM by way of a diode D3, to operate a fan 80F. When the main switch 2 shown in FIG. 6 is turned on, the fan 80F is operated by a voltage supplied from the lighting device system power supply VCL by way of a diode D4.

Moreover, when the commercial power supply is connected, a fan 87 is operated by the output of the rectifying/smoothing circuit 83a, to forcibly cool the battery monitoring/charge control portion 80 including the constant current circuit 83c having a large heat generation amount.

When the main switch 2 shown in FIG. 6 is turned on, the control system power supply VRG is supplied to the battery monitoring/charge control means 82 by way of a diode D5. The battery monitoring/charge control means 82 judges, on the basis of the voltage supplied to a running control terminal 82h by way of a diode D6 which is more than the threshold value, that the main switch 2 is turned on, and then performs the control for the running state.

In such a control for the running state, the voltage and the temperature of each battery unit are monitored in the same manner as during the charge; the power supply capacity of the running power supply 30 is calculated on the basis of the detected voltage of the running power supply 30 and the motor drive current detected by the current detector 22, and the remaining amount meter 89 is driven on the basis of the calculated power supply capacity to indicate the remaining capacity of the battery; and when the remaining capacity of the running power supply 30 reaches the predetermined warning level, a warning lamp is illuminated to perform a visual display or the buzzer 92 is operated to provide attention to an operator.

When the temperature reaches the limit of the allowable range or the motor current detected by the current detector 22 is excessively increased, the battery monitoring/charge control means 82 supplies the motor output reducing command signal 82i to the running control means 61 shown in FIG. 9 to reduce the supply of power to the running motor 70M. Moreover, when the temperature exceeds the allowable range or the motor current apparently becomes abnormal, the abnormal alarm is generated by the warning lamp 90 and the buzzer 91 or the motor operation stoppage command signal 82j is supplied to the running control means 61 shown in FIG. 10 to stop the operation of the running motor 70M.

To prevent the running power supply 30 from being excessively charged by the regenerative braking, the battery monitoring/charge control means 82 monitors the voltage and the temperature of each of the battery units 30a to 30n, and outputs the regenerative braking enabling signal 82k for permitting the regenerative braking when the charge is permissible for the running power supply 30, so that the running control means 61 performs the regenerative braking if needed when the regenerative braking is permissible.

In the circuit construction shown in FIG. 11, the diodes D1 to D6 are used for preventing the wraparound between two line power supplies. However, to reduce the voltage loss due to the forward step-down voltage of the diode, a switch circuit using a transistor or the like may be used for preventing the wraparound.

In this embodiment, a power supply required for the charge control is supplied by way of the DC-DC converter 84 for charge control, so that even when the main switch 2 is turned on in the charging state, the DC-DC converter 40 (FIG. 6) for supplying the control system power supply VRG and the lighting device system power supply VCL is controlled in the non-operable state. However, by use of the input-output insulation type DC-DC converter 83b for supplying the voltage for charging, even when the main switch 2 is turned of, the DC-DC converter 40 shown in FIG. 6 may be forcibly started and the constant current circuit 83c of a variable current type automatically may supply the predetermined initial current value. Thus, in the state that the voltage of the running power supply 30 is lowered, the DC-DC converter 40 is operated by power supplied from the constant current circuit 83c, to output the control system power supply VRG and the lighting device system power supply VCL, thus supplying a power supply to the battery state detecting portion 81 and the battery monitoring/charge control means 82.

In this case, the battery monitoring/charge control means 82 supplies the signal indicating the charging state to the running control portion 60, to make the power supply control circuit 71 in the non-operable state. Moreover, a switch circuit which is turned off in the charging state is preferably interposed between the power supply output terminal 40d of the lighting device system power supply VCL and the lighting device system circuit portion 50 shown in FIG. 8, to eliminate the unnecessary power consumption.

With this construction, there can be eliminated the DC-DC converter 84 for charge control shown in FIG. 11 and various diodes D1 to D6 for preventing the wraparound of the output voltage VCH of the DC-DC converter 84 and the other power supply systems VRG and VCL.

In this embodiment, the charging current is accurately detected using the current detector 21 for a small current, and the drive current of the running motor 70M is accurately detected by the current detector 22 for a large current. However, one current detector may be provided in a current path (for example, the portion shown by the numeral CT in FIG. 6) common to respective lines.

Figure 12:
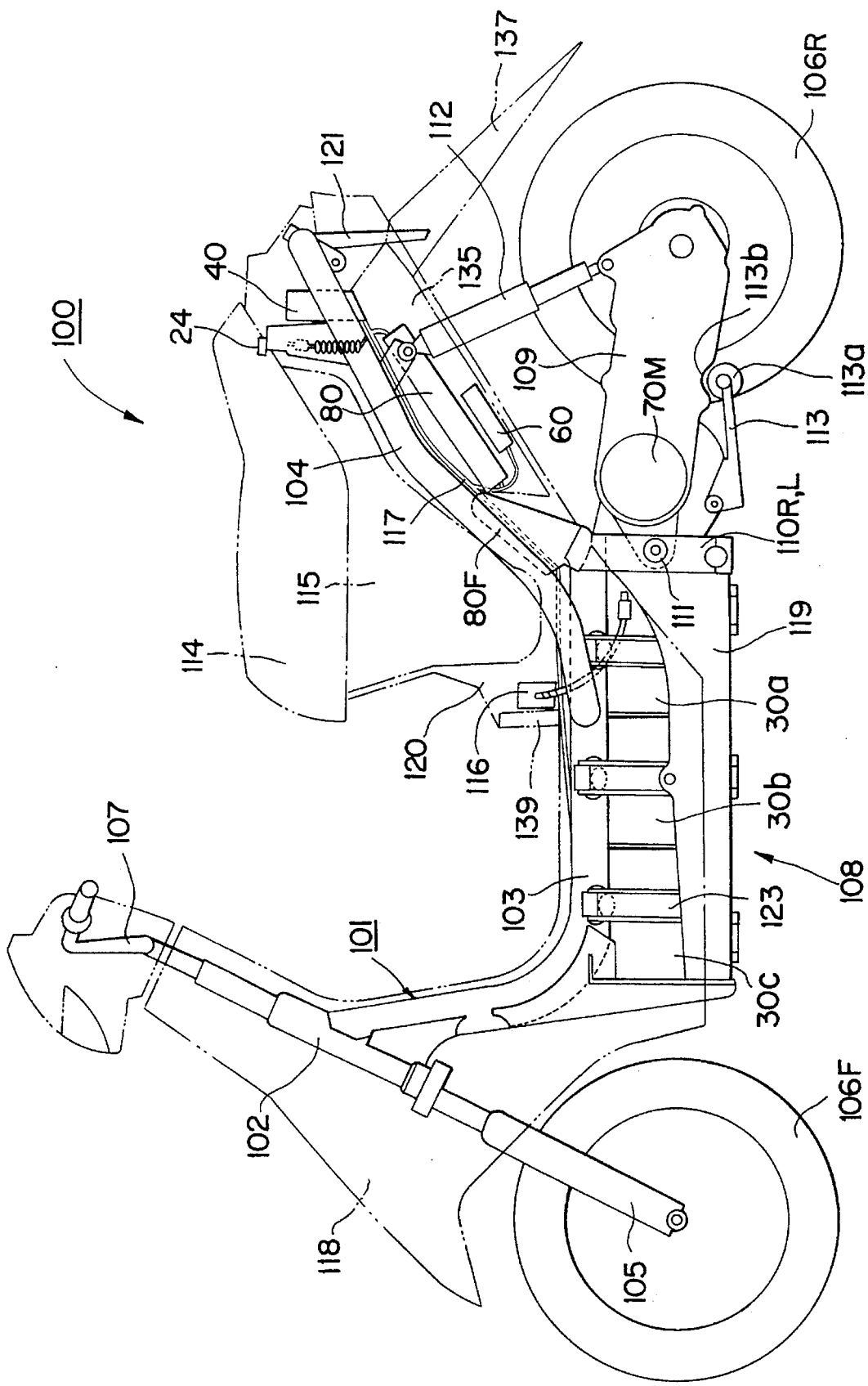
FIG. 12 is a side view of an electric motor driven two-wheeled vehicle.
Figure 13:
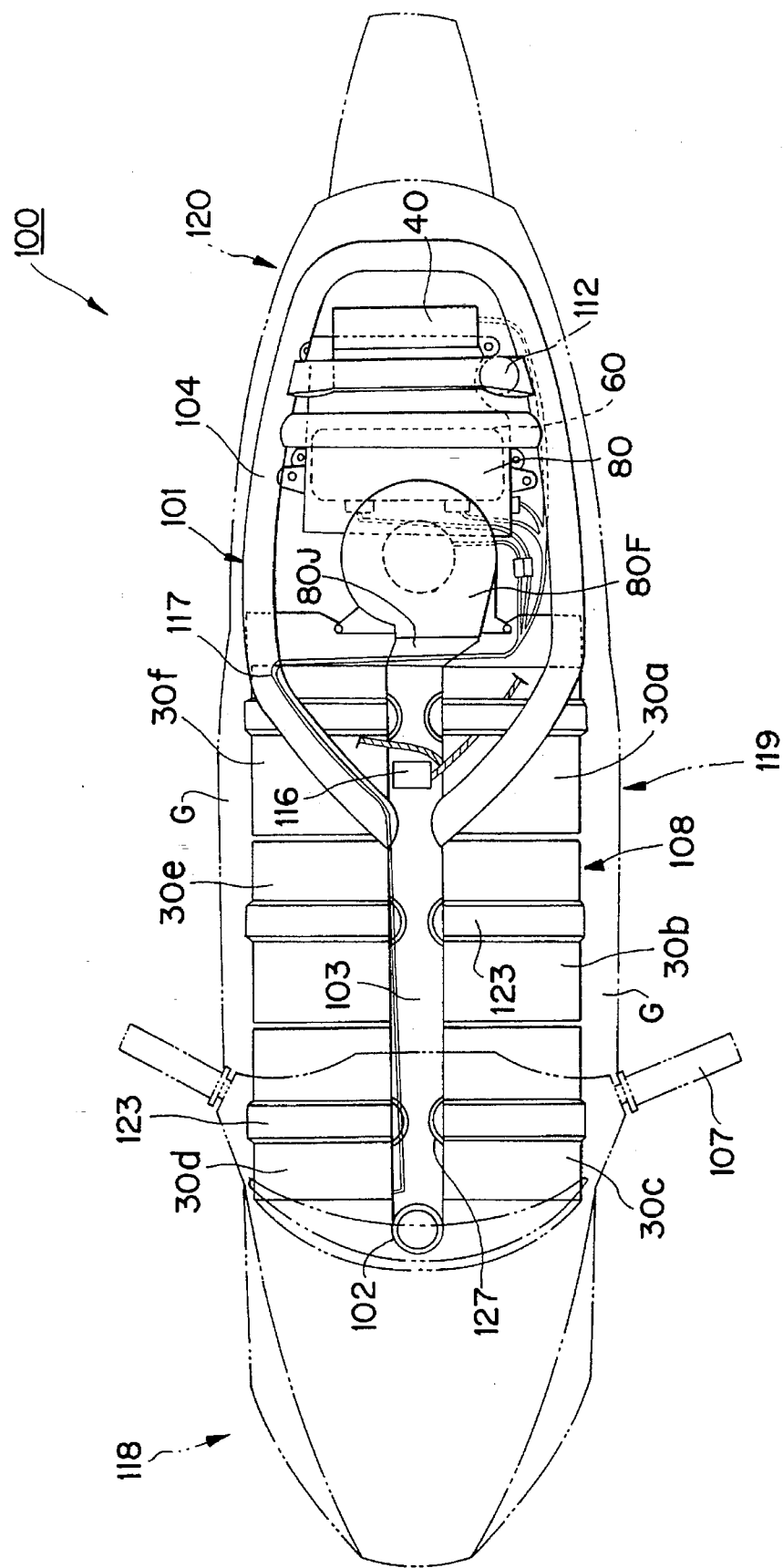
FIG. 13 is a plan view of an electric motor driven two-wheeled vehicle.
Figure 14:
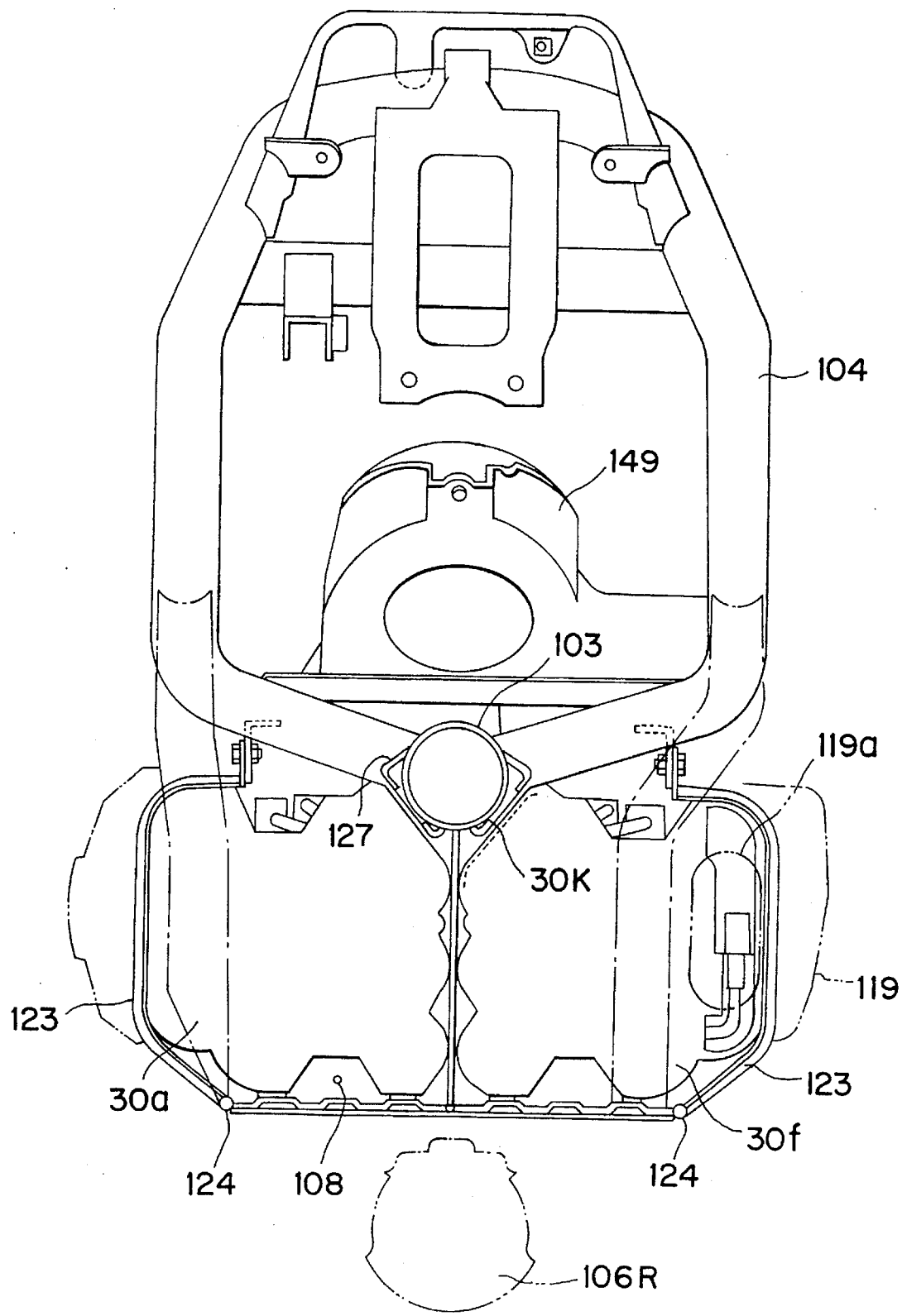
FIG. 14 is a rear view of an electric motor driven two-wheeled vehicle.

Next, an electric motor driven two-wheeled vehicle, to which the power supply unit for an electric motor vehicle according to the present invention is applied, will be described. FIG. 12 is a side view of an electric motor driven two-wheeled vehicle; FIG. 13 is a plane view of FIG. 12; and FIG. 14 is a rear view of FIG. 12.

A body frame 101 of an electric motor driven two-wheeled vehicle 100 includes a head pipe 102 as a front frame, intermediate frame 103 and a rear frame 104, which are connected to each other. A front fork 105 is mounted to the head pipe 102, and supports a front wheel 106F by way of the front fork 105 in such a manner as to be operable by a steering handle 107. A running power supply containing portion 108 is formed on the lower portion of the intermediate frame 103. Battery units 30a to 30f (three units for each of the right and left sides) are contained in the running power supply containing portion 108.

In a power swing unit 109 containing a running motor 70M, the front end thereof is mounted on a pivot 111 provided between a pair of mounting pipes 110L and 110R hung from the rear frame 104 so as to be vertically swingable; and the upper rear end thereof is supported by the rear frame 104 by way of a suspension 112. A rear wheel 106R is supported by the rear end of the power swing unit 109. A side stand switch 23 (not shown) for detecting the containing state of a side stand 11 is provided at the pivot portion of the side stand 113. A roller 113a is provided at the tip of the side stand 113, and which fixedly abuts a recessed portion 113b provided on the power swing unit 109.

A helmet containing portion 115 is provided at the lower portion of a seat 114. A batter monitoring/charge control portion 80, a running control portion 60, and a fan 8OF are provided under the helmet containing portion 115. A DC-DC converter 40 is provided at the back of the battery monitoring/charge control portion 80. A seat switch 24 for detecting the seating state of an operator is provided at the lower portion of the seat 114.

A fuse box 116 is disposed over the running power supply containing portion 108. An opening/closing cover 139 is opened/closed at the time of the exchange of a fuse. The electric connection between the control portions 80 and 60, DC-DC converter 40, fuse box 116 and a running power supply 30 is performed by means of a wiring assembly 117 disposed along the body frame 101.

The peripheral portion of the head pipe 102 and the front peripheral portion of the intermediate frame 103 are covered with a front cover assembly 118. The upper portion of the running power supply containing portion 108 is made in a step-floor (see numeral 147 in FIG. 17), and the peripheral portion of the running power supply containing portion 108 is covered with a battery cover assembly 119. The rear portion of the body is covered with a rear cover assembly 120. The seat 114 is provided on the upper portion of the rear cover assembly 120 and a number plate mounting portion 121 is provided on the rear portion of the rear cover assembly 120.

Figure 15:
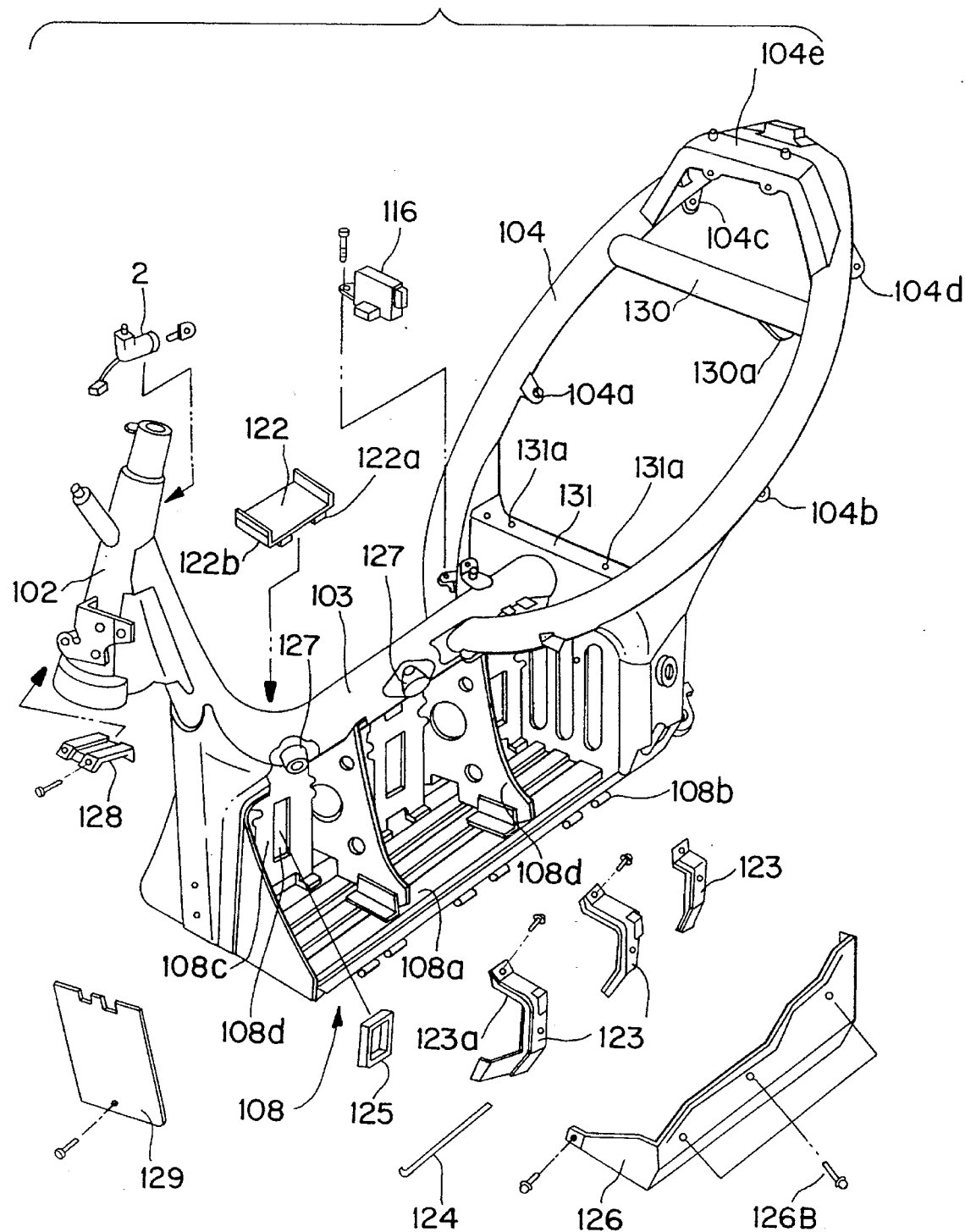
FIG. 15 is a perspective view showing a frame structure of an electric motor driven two-wheeled vehicle and a running power supply containing portion.

FIG. 15 is a perspective view showing the frame structure and the running power supply containing portion. The rear frame 104 has a rear tube bent in a substantially O-shape, and the right and left ends of the front portion of the rear tube are fixed to the intermediate frame 103 by welding or the like.

The running power supply containing portion 108 is partitioned into battery unit containing chambers (three for each of the right and left sides). A battery unit receiving base 122 is mounted, for each chamber, on the corrugated steel plate forming a floor surface 108a of the containing portion. The battery units 30a to 30f are mounted on these battery receiving bases 122, and are respectively fixed by battery fixing bands 123. Hinge portions 108b are provided at both sides of the lower portion of the floor surface 108a for each battery containing chamber. The lower end portion of the battery fixing band 123 is connected to the hinge portion 108b through a pin 124 such that the battery fixing band 123 is swingable. In this embodiment, three battery fixing bands 123 on each side are mounted by one pin 124.

Damping materials 122a and 122b having high hardness are respectively provided on the lower surface and the side surface of the battery unit receiving base 122 to be engaged to the floor surface 108a, and to stabilize the mounting of the battery unit.

A slot 108d or the like is provided in each partitioning portion 108c at the center, and a damping material 125 is fitted in the slot 108d such that each side of the right and left battery units is damped and supported by one damping material.

The battery units are contained in the battery containing chambers, and then the tips of the battery fixing bands 123 are screwed to the intermediate frame 103, to fix the battery units 30a to 30n. A damping material 123a is mounted on the inner surface of the battery fixing band 123 for damping and supporting the side surface of each of the battery units 30a to 30n. The lower cover 126 of the battery containing chamber is fixed to each battery fixing band 123 by a screw 126B, to cover the lower side of the battery containing chamber.

A round hole or slot is provided in each partitioning portion 108d of the battery containing chamber to reduce the weight while keeping the strength.

Figure 19:
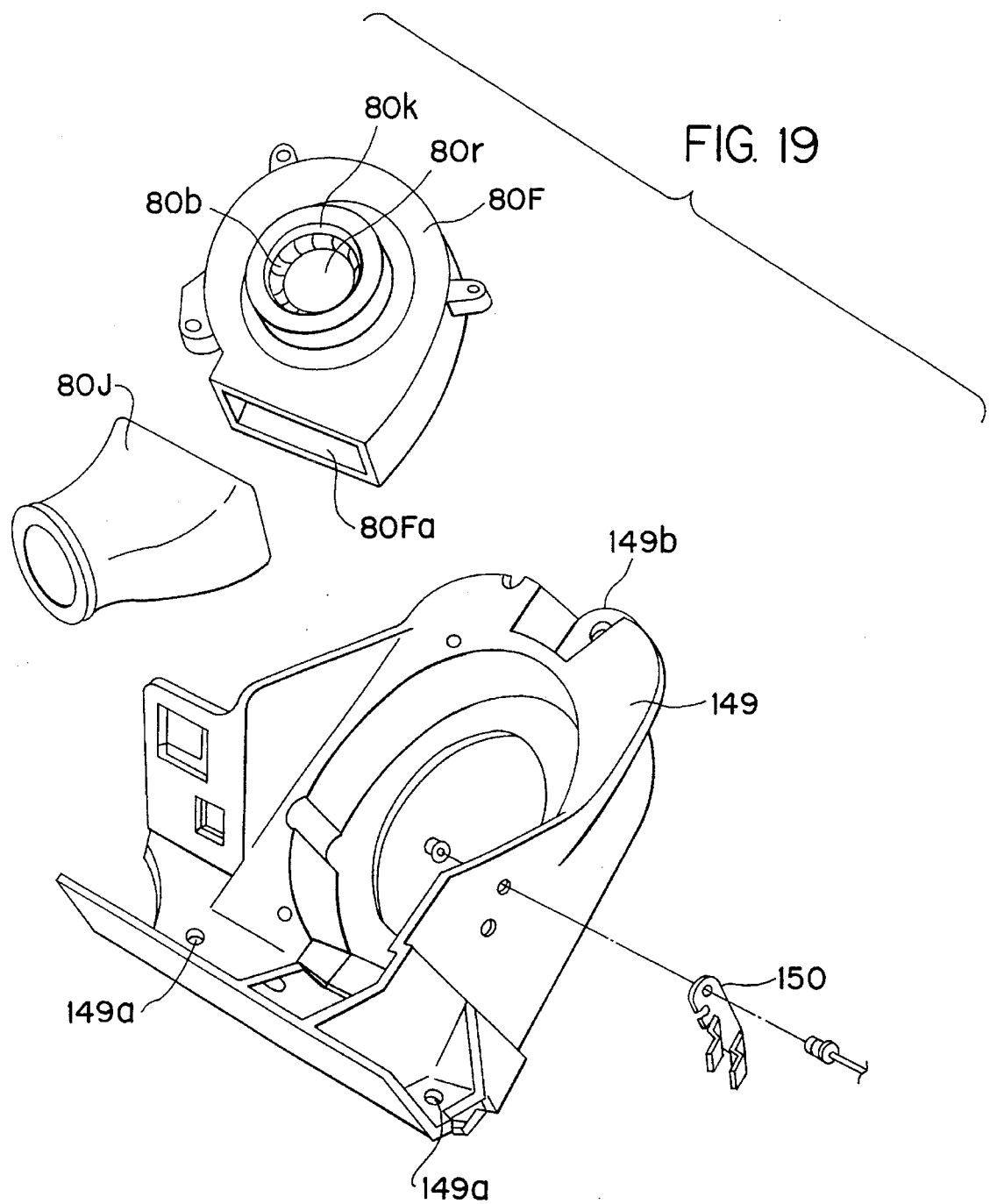
FIG. 19 is a perspective view showing a mounting structure for a fan.

The intermediate frame 103 is formed of a hollow pipe, and a duct 127 for feeding a wind to each battery unit is fixed to the intermediate frame 103 by welding or the like. Each duct 127 is provided at the position to be engaged with a cooling air suction port (described later) of the battery unit contained in the battery containing chamber. The rear end of the intermediate frame 103 is connected to a blow-off port 8OFa of a fan 8OF through a joint 80J, as shown in FIG. 19. The interior of the pipe of the intermediate frame 103 is used as a wind passage, to supply a cooling wind to each of the battery units 30a to 30f.

A main switch 2 (key switch) is mounted on the upper end portion of the head pipe 102 as the front frame. When the key of the main switch 2 is operated to be locked, the steering cannot be turned. A front cover stay 128 is mounted on the lower end portion of the head pipe 102.

A member 129 for preventing mud stuck on the inner surface of a front fender is mounted in front of the running power supply containing portion 108.

Mounting portions 104a to 104d of control portion mounting members, and a mounting portion 104e of a load carrying platform are provided on the rear frame 104. A mounting portion 130a on the upper end side of the suspension 112 is provided on a cross pipe 130. The fuse box 116 is mounted on the base end portion of the rear frame 104. A screw hole 131a for mounting a fan case is formed at the upper end folding portion of a cross panel 131.

Figure 16:
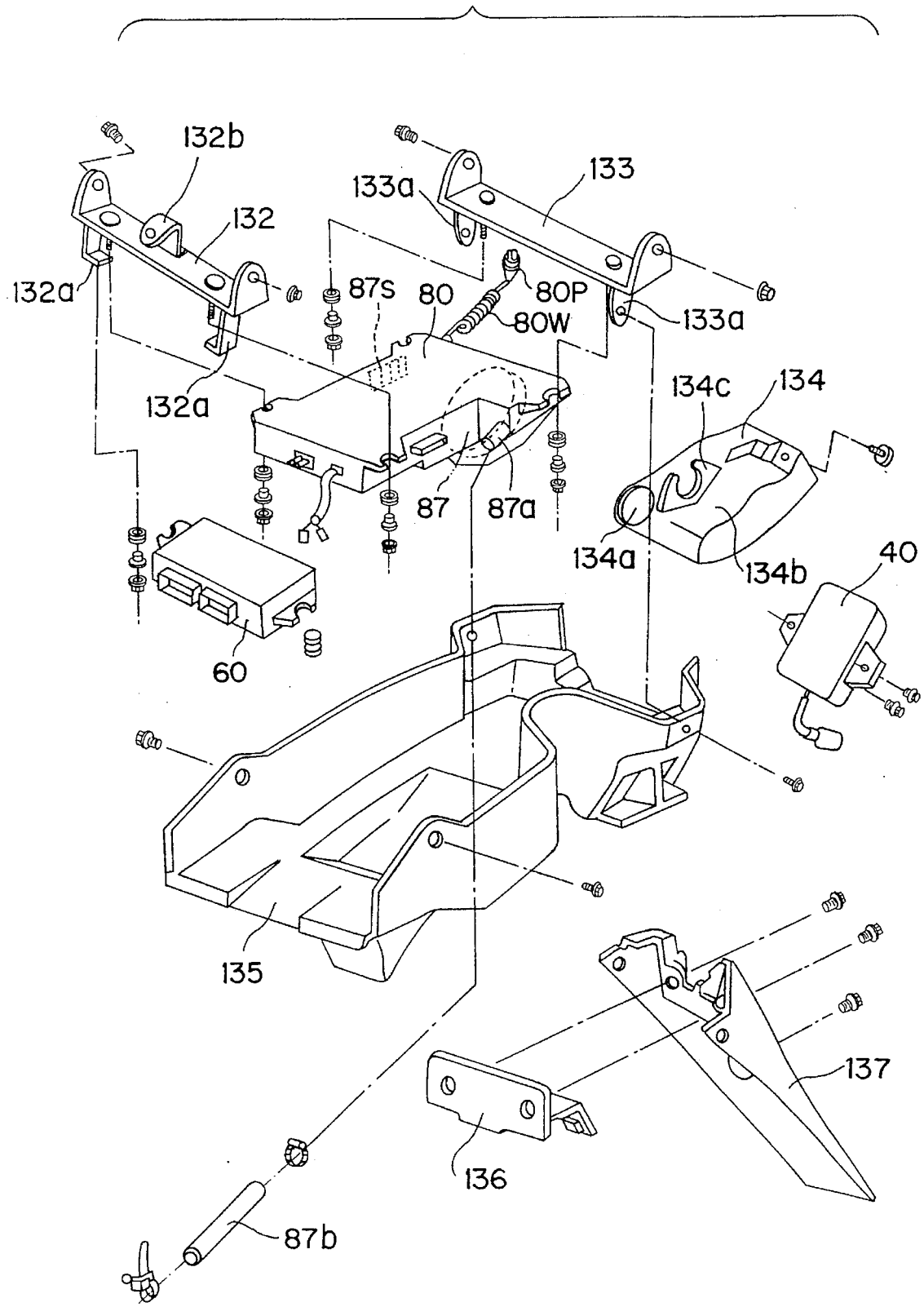
FIG. 16 is an exploded view in perspective of a mounting structure for a battery monitoring/charge control portion and a running control portion, and part of a rear cover assembly.

FIG. 16 is an exploded view in perspective of the mounting structures for a battery monitoring/charge control portion and a running control portion and part of rear cover assembly.

A front mounting member 132 is mounted between the mounting portions 104a and 104b of the control portion mounting member shown in FIG. 15; and a rear mounting member 133 is mounted between the mounting portions 104c and 104d of the control mounting member shown in FIG. 15. The four corners of the battery monitoring/control portion 80 are screwed to the lower sides of the control portion mounting members 132 and 133 through washers. A pair of mounting legs 132a are provided on the front mounting member 132, and the running control portion 60 is mounted on the mounting legs 132a. A raised portion 132b for mounting and supporting a fan case 149 (see FIG. 19) described later is provided on the front mounting member 132.

A fan 87 operated during charging is provided within the battery monitoring/charge control portion 80. It sucks an air from slits 87S provided on the side surface of the case into the interior of the case, and discharge the air from a discharge port 87a of the fan 87 into the rear cover assembly 120 by way of a discharge hose 87b provided along the rear frame 104 for forcibly cooling the interior of the battery monitoring/charge control portion 80.

A commercial power supply cord 80W connected to the rear end portion of the battery monitoring/charge control portion 80 passes through a though-hole or a cut-out portion 134a provided on the side surface of a charger cord box 134, so that the curl cord portion of the commercial power supply cord 80W is contained in a recessed portion 134b of the charger cord box 134. A raised portion 134c with a curved cut-out constitutes the fitting portion with the cross pipe 130 shown in FIG. 15.

The DC-DC converter 40 is screwed on the back surface of the charger cord box 134. The rear end of a lower rear fender 135 for covering the lower portion of each of the control portions 80 and 60 is screwed to a pair of the mounting legs 133a provided on the rear mounting member 133. A fender stay 136 is provided together with a rear fender 137.

Figure 17:
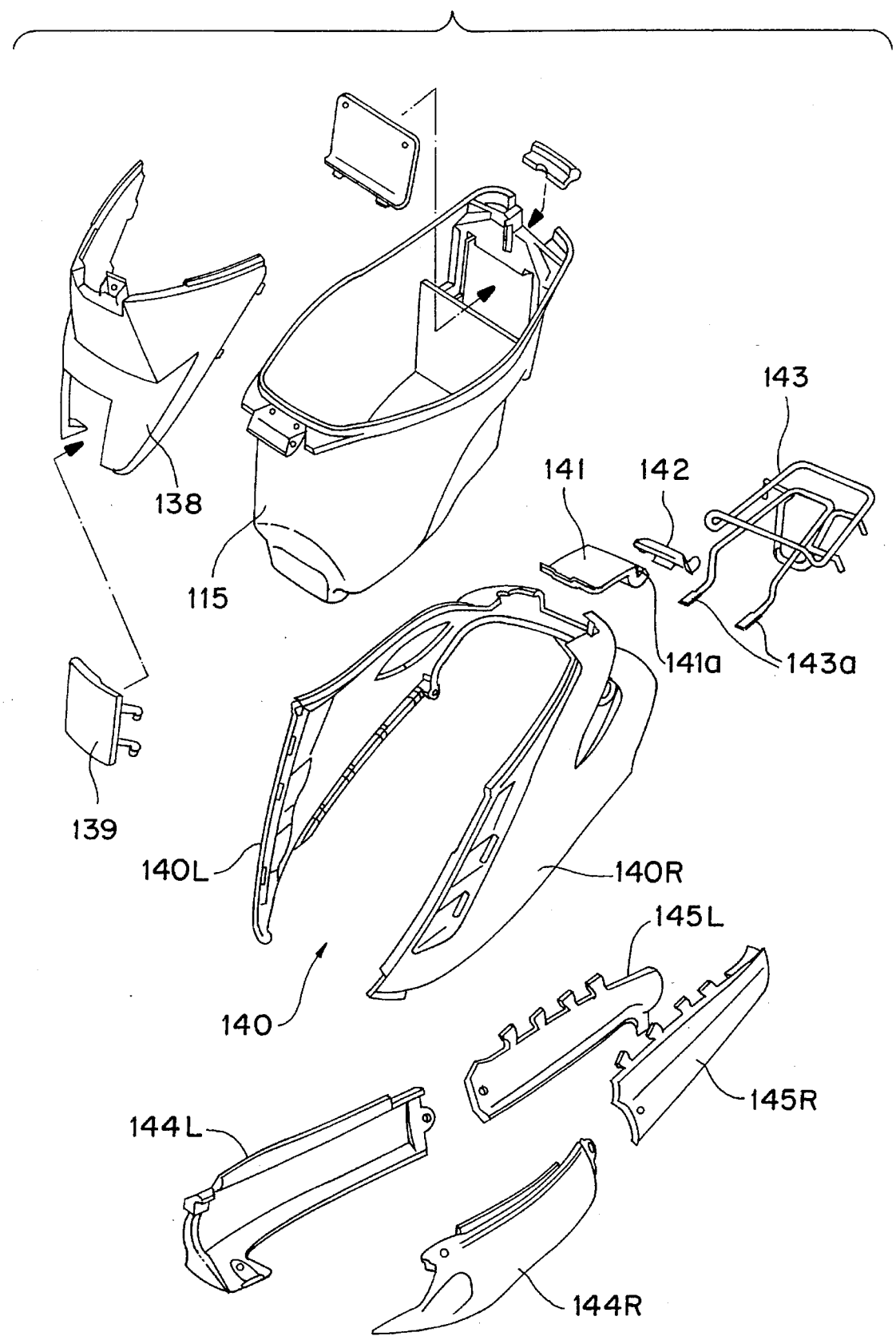
FIG. 17 is an exploded view in perspective of a helmet containing portion, part of a rear cover assembly, and part of a battery cover assembly.

FIG. 17 is an exploded view in perspective of a helmet containing portion, part of a rear cover assembly and part of a battery cover assembly.

A cover 139 for fuse exchange is provided on the lower portion of a center cover 138 for covering the front portion of the helmet containing portion 115 in a manner to be freely opened/closed. By opening the cover 139, fuses F1, F2 and F3 (see FIG. 6) within the fuse box (see FIG. 12) are exchanged.

A body cover 140 includes right and left covers 140R and 140L, the rear portions of which are joined to each other. On the rear portion of the body cover 140, a cover 141 for taking-off the commercial power supply cord 80W shown in FIG. 16 is mounted such that the lower end portion 141a thereof is openably engaged with a hinge member 142.

If needed, the load-carrying platform 143 is mounted such that the tip 143a thereof is screwed to the mounting portion 104e of the load-carrying platform 143 shown in FIG. 15.

Numeral 144R and 144L designate right and left floor side covers, and 145R and 145L are side covers for covering both side portions of the running power supply containing portion 108 shown in FIGS. 12 and 15.

Figure 18:
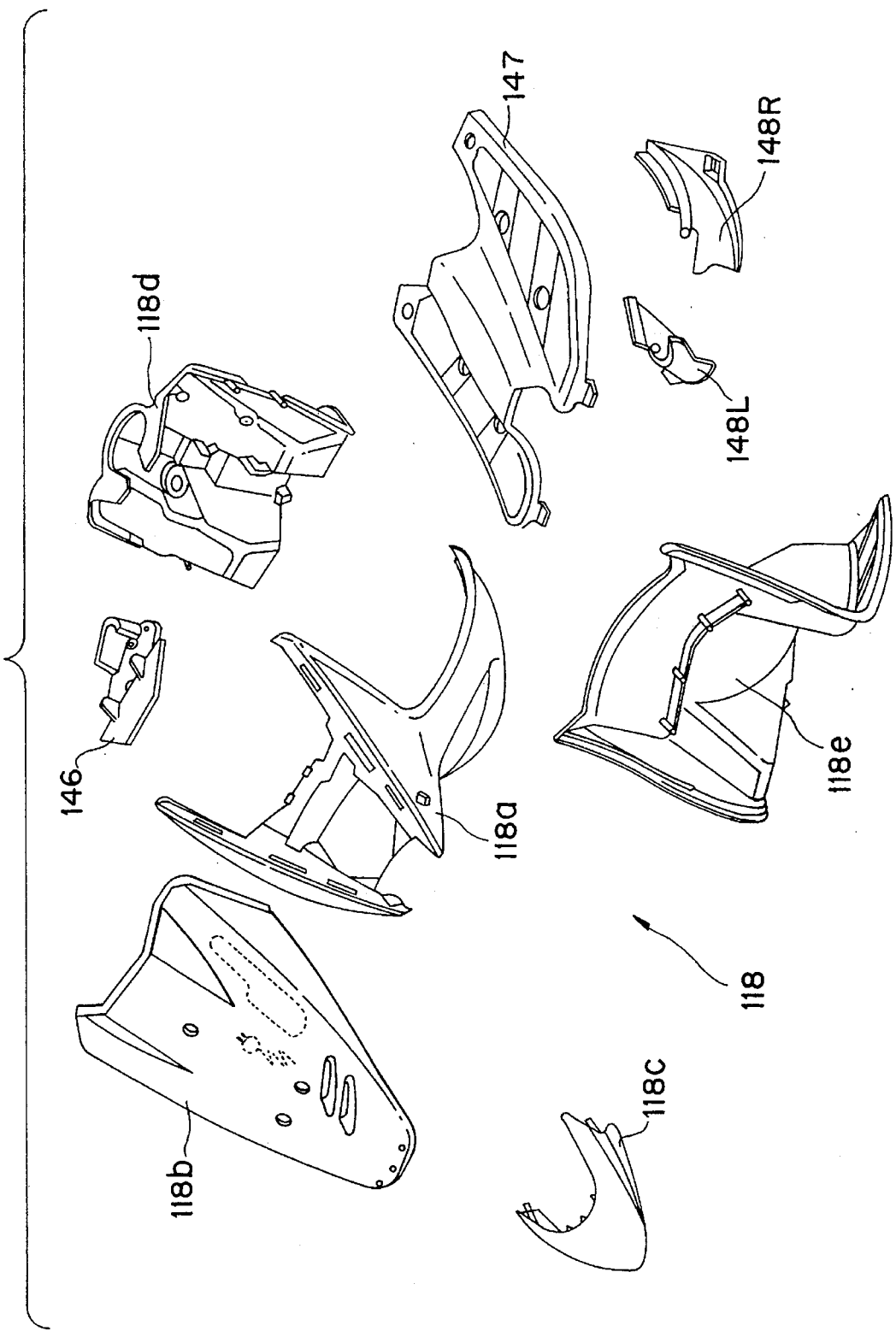
FIG. 18 is an exploded view in perspective of a front cover assembly.

FIG. 18 is an exploded view in perspective of a front cover assembly. A front cover assembly 118 includes a front fender 118a, a front cover 118b, a fender mat guard 118c, a front inner and upper cover 118d and a front inner and lower cover 118e. The front cover 118b is mounted on the upper front surface of the front fender 118a, and the fender mat guard 118c is mounted on the tip of the lower portion of the front cover 118b. The front inner and upper cover 118d and the front inner and lower cover 118e are vertically assembled, and they are further assembled with the back surface side of the front fender 118a.

A steering mat guard 146 is mounted on the lower end of the steering pipe. A step floor 147 is provided for covering the upper portion of the running power supply containing portion 108 and serving as the foot rest for an operator. Right and left side floors 148R and 148L are mounted on the rear lower portions of the step floor 147.

FIG. 19 is a perspective view showing the mounting structure of a fan. The fan 8OF is mounted in the fan case 148. The fan case 149 is mounted on the cross panel 131 shown in FIG. 14 by screwing the mounting hole 149a provided on the front portion thereof to the screw hole 131a provided on the upper end folding portion of the cross panel 131. A rear end 149b of the fan case 149 is screwed to the raised portion 132b of the front mounting member 132 shown in FIG. 15. The fan 8OF includes a fan blade 80b rotating together with a fan rotor 80r, and which sucks an air from an opening 80k provided on the upper side in the figure, and supplies the air into the intermediate frame 103 shown in FIG. 13 by way of a joint 80j connected to a blow-off port 8OFa for air-cooling the battery unit. A stay 150 mounted on the side surface of the fan case 149 is adapted to fix a feed connector (not shown) to the fan 80F.

Figure 20:
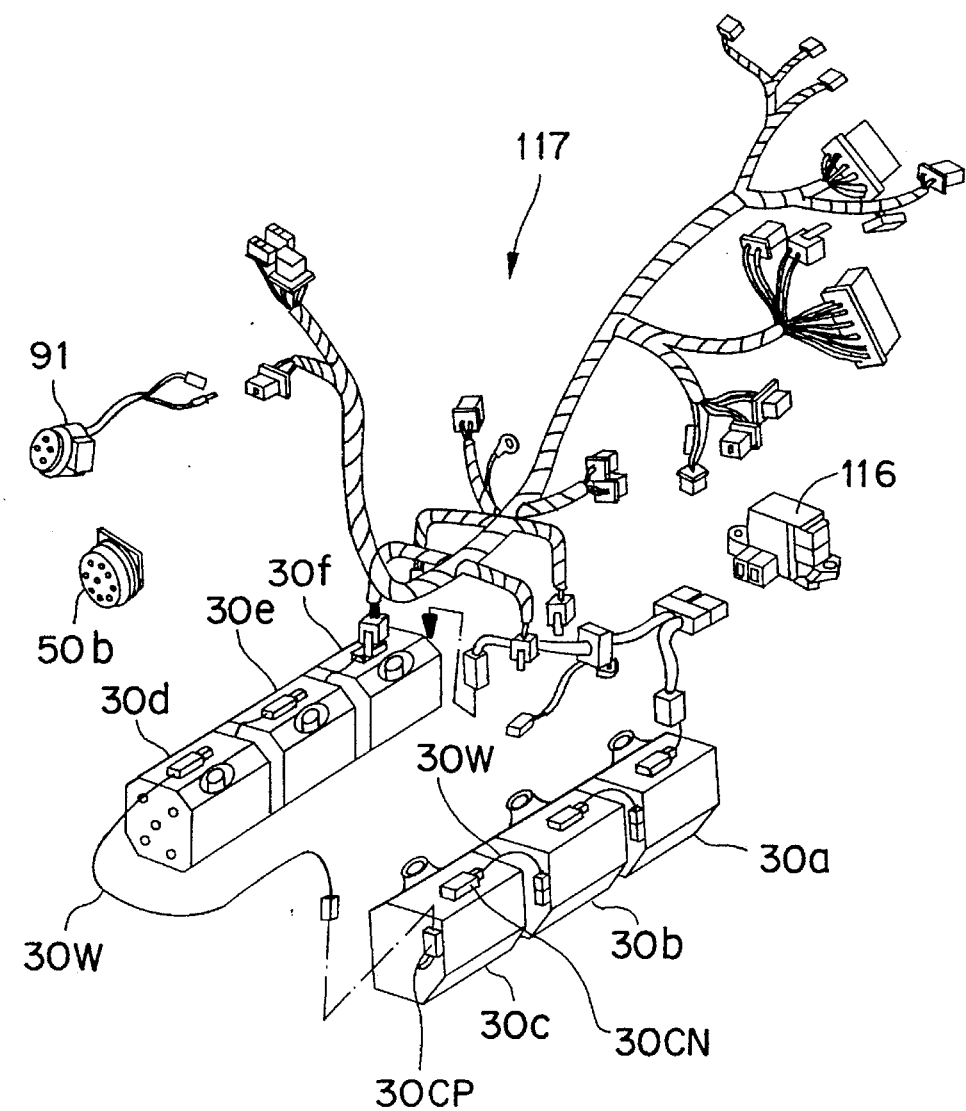
FIG. 20 is a perspective view showing a wiring assembly and the wiring of a battery unit.

FIG. 20 is a perspective view showing the wiring assembly and the wiring for the battery unit. The main portion of a wiring assembly 117 is disposed along each frame through wiring fixtures (not shown) mounted on the intermediate frame 103 and the rear frame 104 with suitable intervals. The tip of each branched wire is provided with a connector. The wiring between the circuit blocks shown in FIG. 6, and various lighting devices shown in FIG. 9 is performed using these connectors.

A horn 50b is provided together with a buzzer 91. The buzzer 91 generates a sound for confirming the turn-on of the main switch 2 and a warning sound at the time of the reduction in the battery capacity. The horn 50b and buzzer 91 are disposed within the front cover assembly 118 shown in FIG. 18.

A negative electrode side connector 3OCN is provided on the upper surface of the case of each of the battery units 30a to 30f, and a positive electrode side connector 30CP is provided on the longitudinal side surface of the case thereof. The connectors 30CP and 3OCN of the adjacent battery units are connected to each other by means of a battery connection wire 3OW having connectors at both sides. Thus, six pieces of the battery units are connected in series to each other. The negative electrode of the running power supply 30 is led from the rear side battery unit 30a and the positive electrode of the running power supply 30 is led from the battery unit 30f. A fuse unit 116 is also provided.

Figure 21:
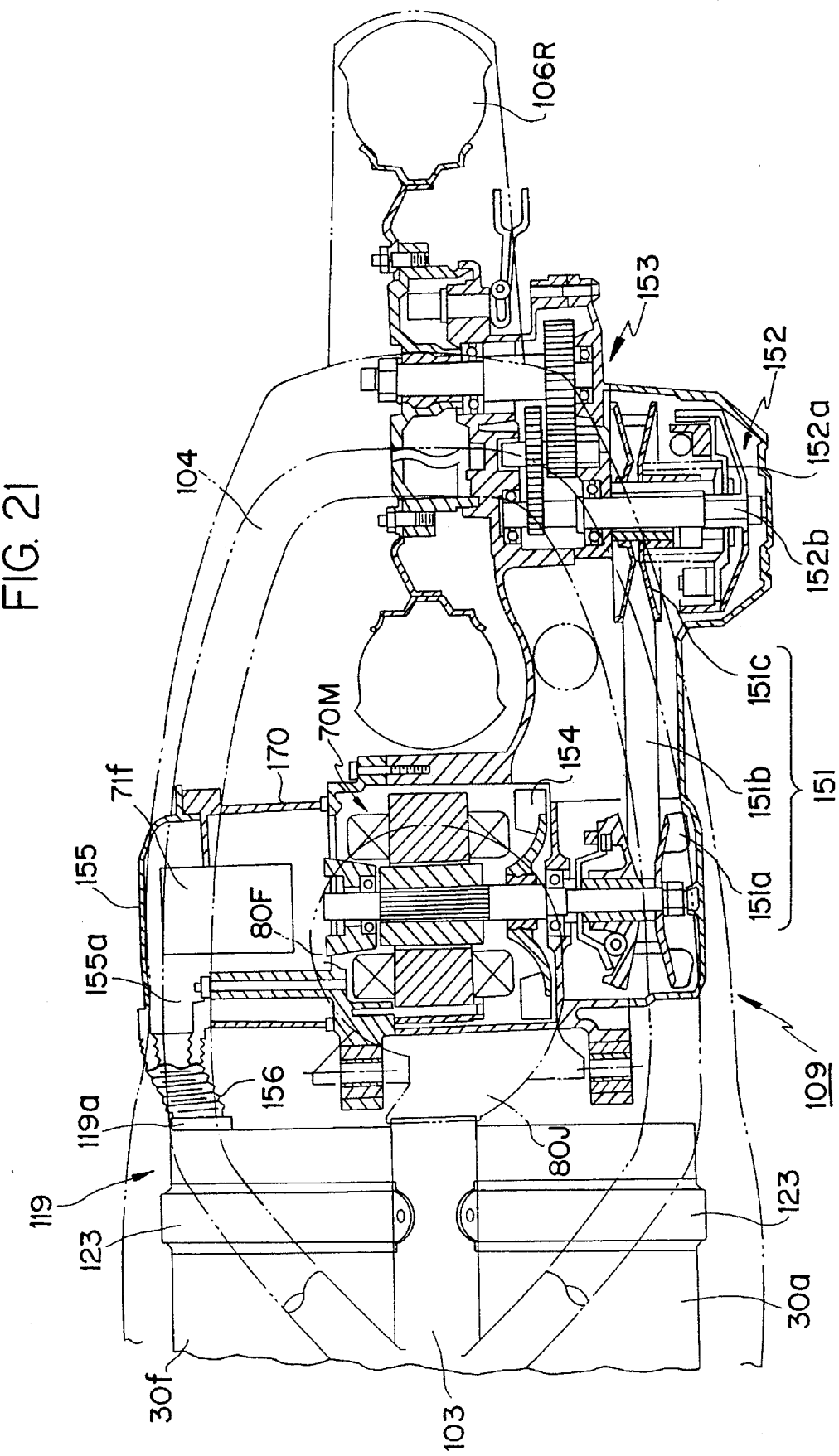
FIG. 21 is a transverse sectional view showing the inner structure of a power swing unit.

FIG. 21 is a transverse sectional view showing the inner structure of a power swing unit. A power swing unit 109 includes a running motor 70M, an endless belt power transmission 151, a one-way clutch 152, a reduction gear mechanism 153 and the like. The rotational output of the running motor 70M is transmitted to an input shaft 152a of the one-way clutch 152 by way of a drive pulley 151a, an endless belt 151b and a driven pulley 151c, and further from an output shaft 152b of the one-way clutch 152 to the rear wheel 106R by way of the reduction gear mechanism 153.

A fan is mounted on the output shaft of the running motor 70M. A motor drive unit 170, and a side cover 155 provided with an air suction port 155a are mounted on the side portion of the running motor 70M. The air suction port 155a is connected to an air discharge port 119a formed at the rear end portion of the battery cover assembly 119 by means of a flexible duct 156.

Figure 22:
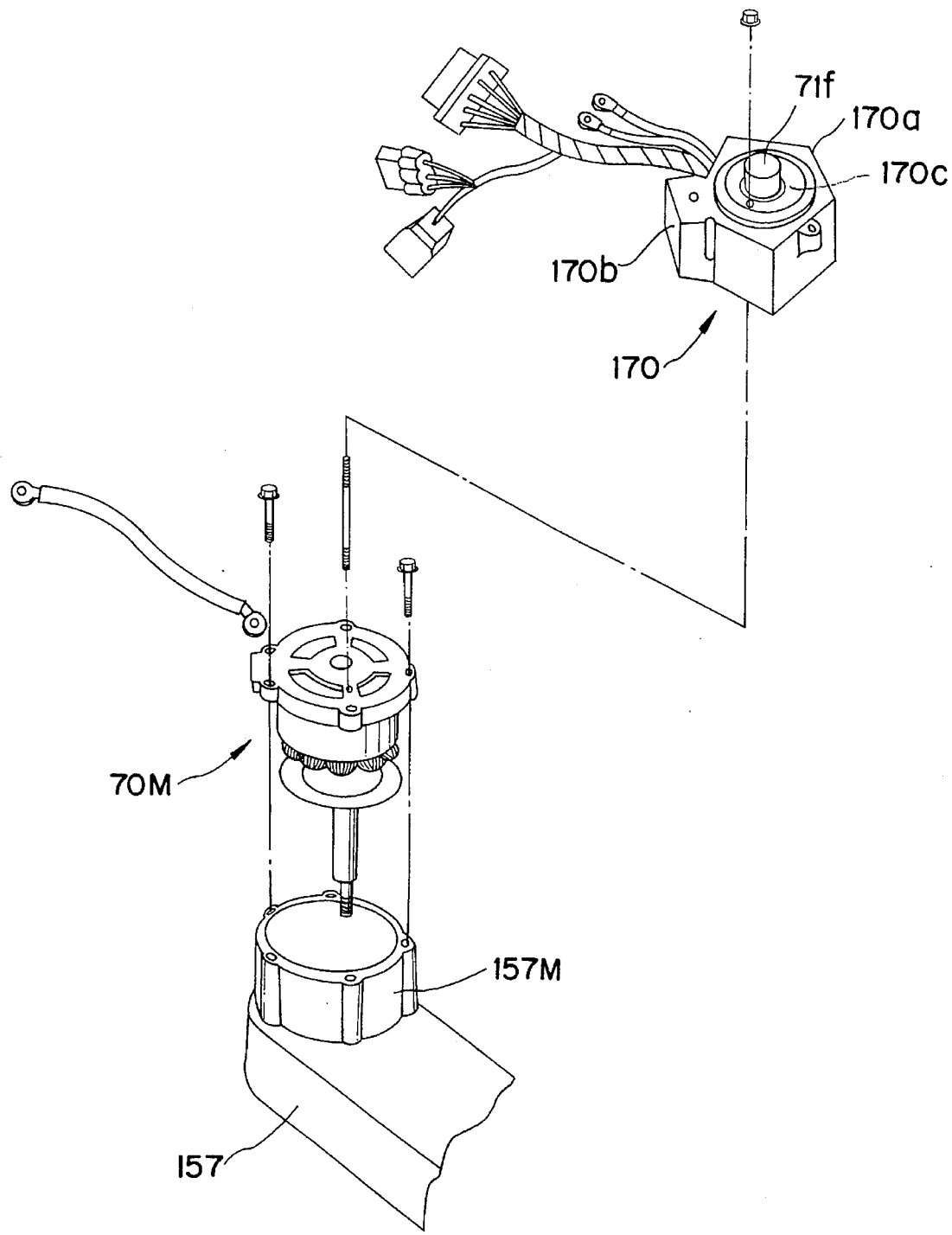
FIG. 22 is an exploded view in perspective of a motor drive unit and a running motor.

FIG. 22 is an exploded view in perspective of a motor drive unit and a running motor. A running motor 70M is fixed by bolts within a motor case 157M formed integrally with a belt case 157. A motor drive unit 170 is fixed by bolts on the side portion of the running motor 70M.

In this motor drive unit 170, the power supply stabilizing capacitor 71f of the power supply control circuit 71 shown in FIG. 10 is disposed substantially at the center of a case 170a, and the semiconductor switch 71a, relays 71b and 71c, diode 71d and resistance 71e constituting the power supply control circuit 71 shown in FIG. 10 are contained in a projecting portion 170b of the case. Moreover, six sets of heat radiating plates 170c having heat radiating fins or the like are disposed around the outer periphery of the power supply stabilizing capacitor 71f, and six sets of semiconductor power switching elements 74a to 74f constituting the power switching circuit 74 shown in FIG. 10 are provided on the heat radiating plates 170c, respectively.

Figure 23:
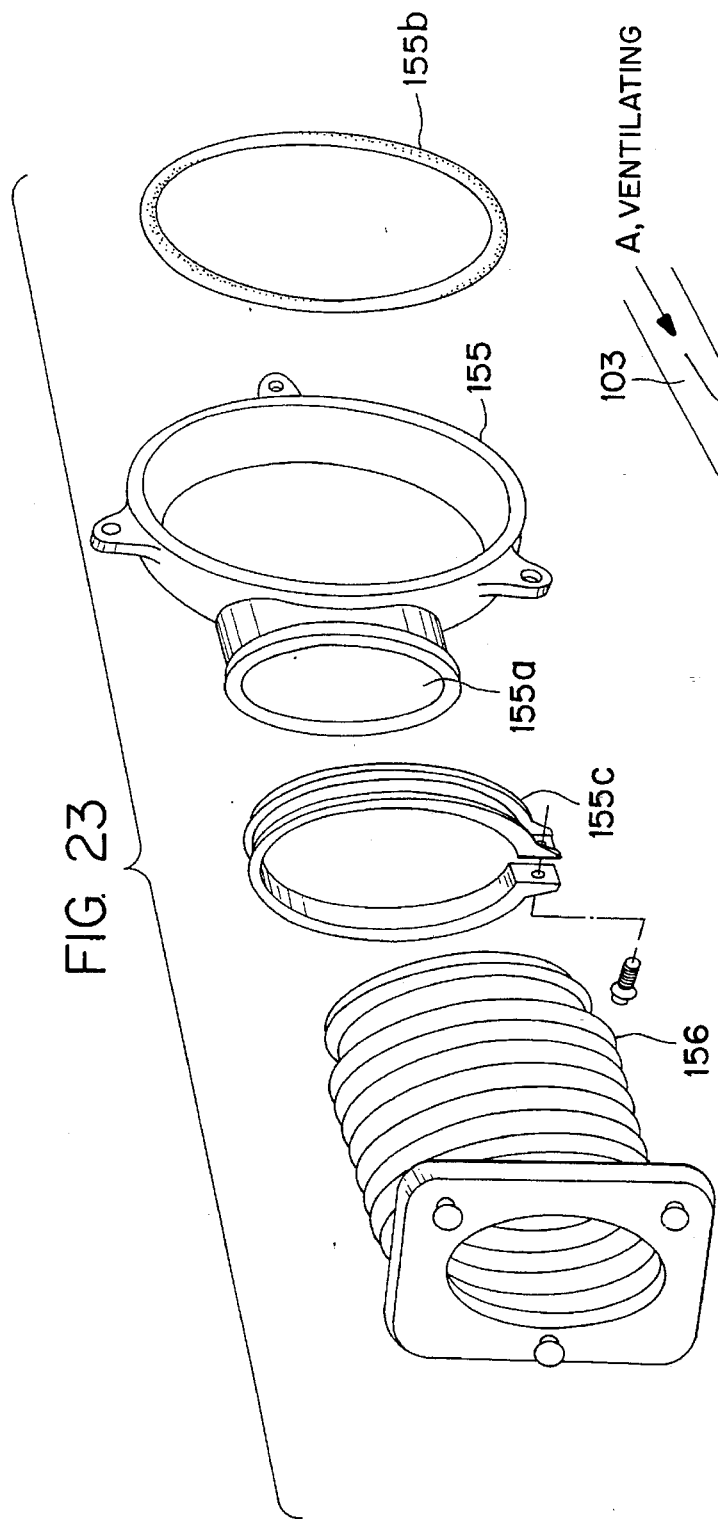
FIG. 23 is an exploded view in perspective of the structure of an air suction portion of a power swing unit.

FIG. 23 is an exploded view in perspective of the structure of an air suction portion to a power swing unit. A side cover 155 provided with an air suction port 155a is screwed to the side surface of the motor drive unit 170 by way of a seal ring 155b. The one end side of the flexible duct 156 is connected to the air suction port 155a by way of a duct pressing ring 155c.

Figure 24:
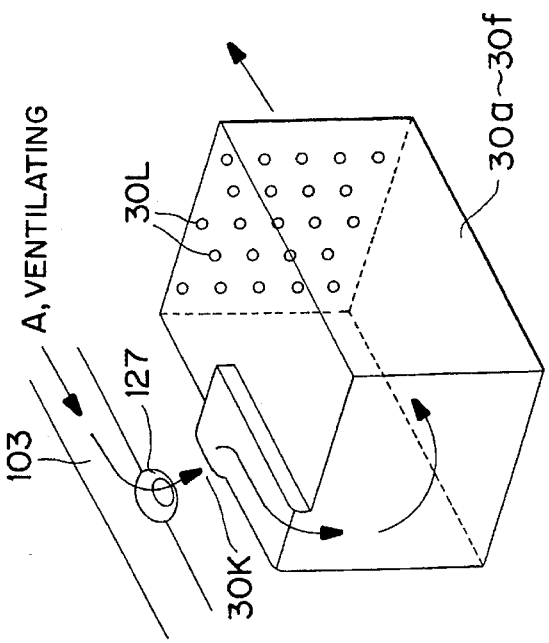
FIG. 24 is an illustrative view of the flow of air in a battery unit.

FIG. 24 is an illustrative view of the flow of an air in a battery unit. In each of the battery units 30a to 30f, air is supplied from the cooling air suction port 30k into the interior of the case. It is led to the one side end, passing between respective secondary batteries BAT (not shown) mounted in the case, and is discharged to the outside from a plurality of cooling air discharge ports 30L formed on the other end side of the case.

As shown in FIG. 13, a ventilating gap G is formed between each of the battery units 30a to 30f contained in the running power supply containing portion 108 and the battery cover assembly 119 for covering the side of each battery unit.

With this gap G, there occurs the flow of air by rotation of the running motor 70M shown in FIG. 21 as follows. Air is supplied from the fan 8OF and discharged from the rear wheel 106F side to the outside, by way of the joint 80j, the interior of the intermediate frame 103, each duct 127 provided in the intermediate frame 103, the cooling air suction port 30k of each battery unit, the interior of the battery unit, the cooling air discharge port 30L of the battery unit, the running power supply containing portion 108 (space covered with the battery cover assembly), the air discharge port 119a formed at the rear end portion of the battery cover assembly 119, the flexible duct 156 connected to the air discharge port 120a, the side cover 155 provided with the air suction port 155a, the motor drive unit 170, the running motor 70M, the fan 154, the endless belt type power transmission 151 within the belt case 157, the one-way clutch 152 and reduction gear mechanism 153.

Accordingly, in the running state that the fan 80F is operated and the fan 154 provided on the downstream side from the running motor 70M is operated accompanied with the operation of the running motor 70M, air flows in the above-described path, to forcibly air-cool the battery units 30a to 30f, the semiconductor power switching elements 74a to 74f for driving the running motor 70M, the running motor 70M, the endless belt type power transmission 151 positioned on the downstream side of the running motor 70M, one-way clutch 152, the reduction gear mechanism 153 and the like.

Moreover, when the battery units 30a to 30f are charged from the commercial power supply, the fan 80F is operated, to forcibly air-cool the battery units 30a to 30f. In addition, when only the fan 8OF is operated, the path extending to the rear wheel 106F side by way of the interior of the power swing unit 109 is large in the air resistance. Accordingly, while the flow of air by way of this path is generated, a majority of air discharged from the cooling air discharge port 30L of each of the battery units 30a to 30f to the interior of the running power supply containing portion 108 is escaped to the outside from the gap of the battery case assembly 120.

Figure 25:
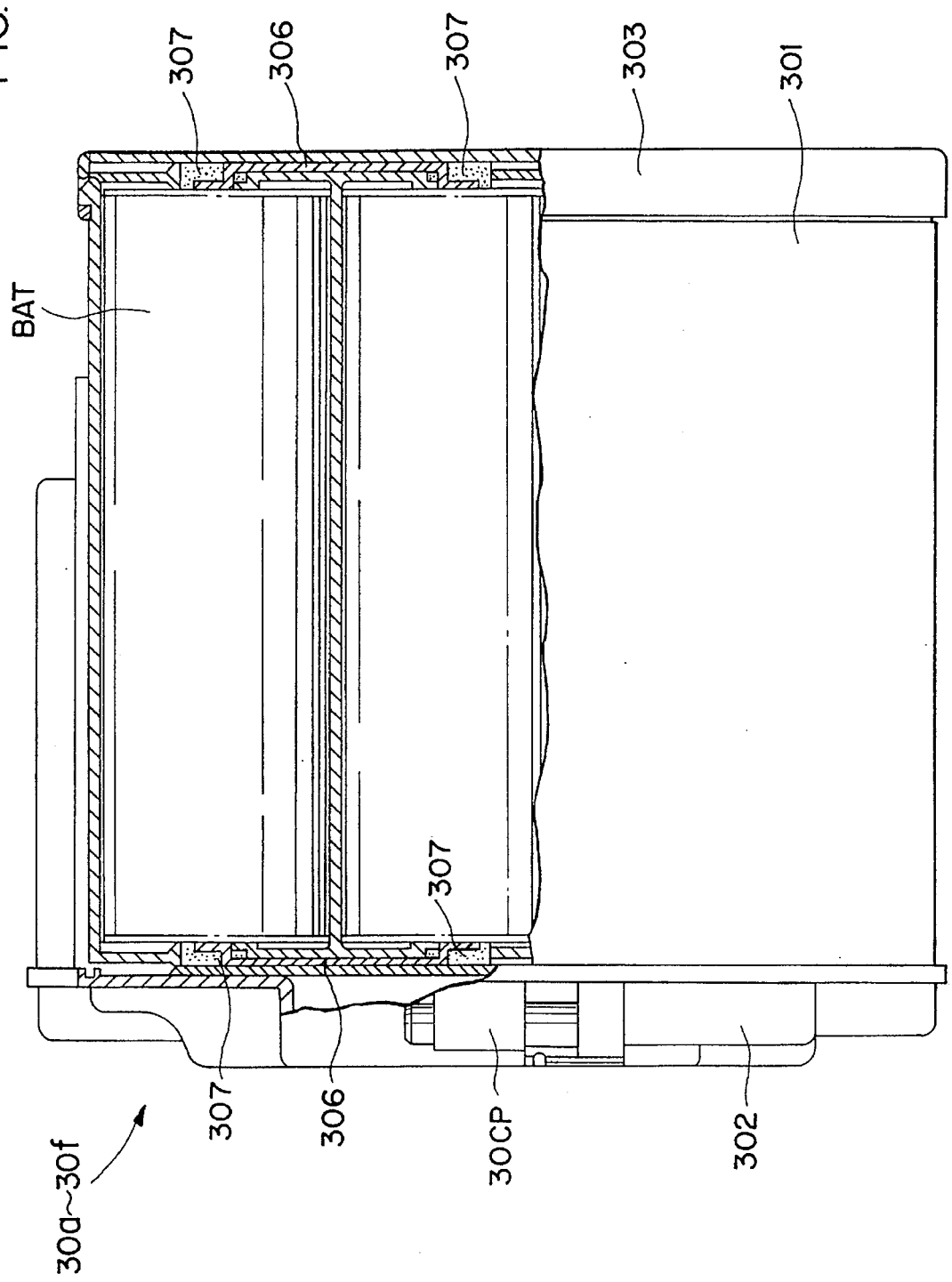
FIG. 25 is a front view of a battery unit.
Figure 26:
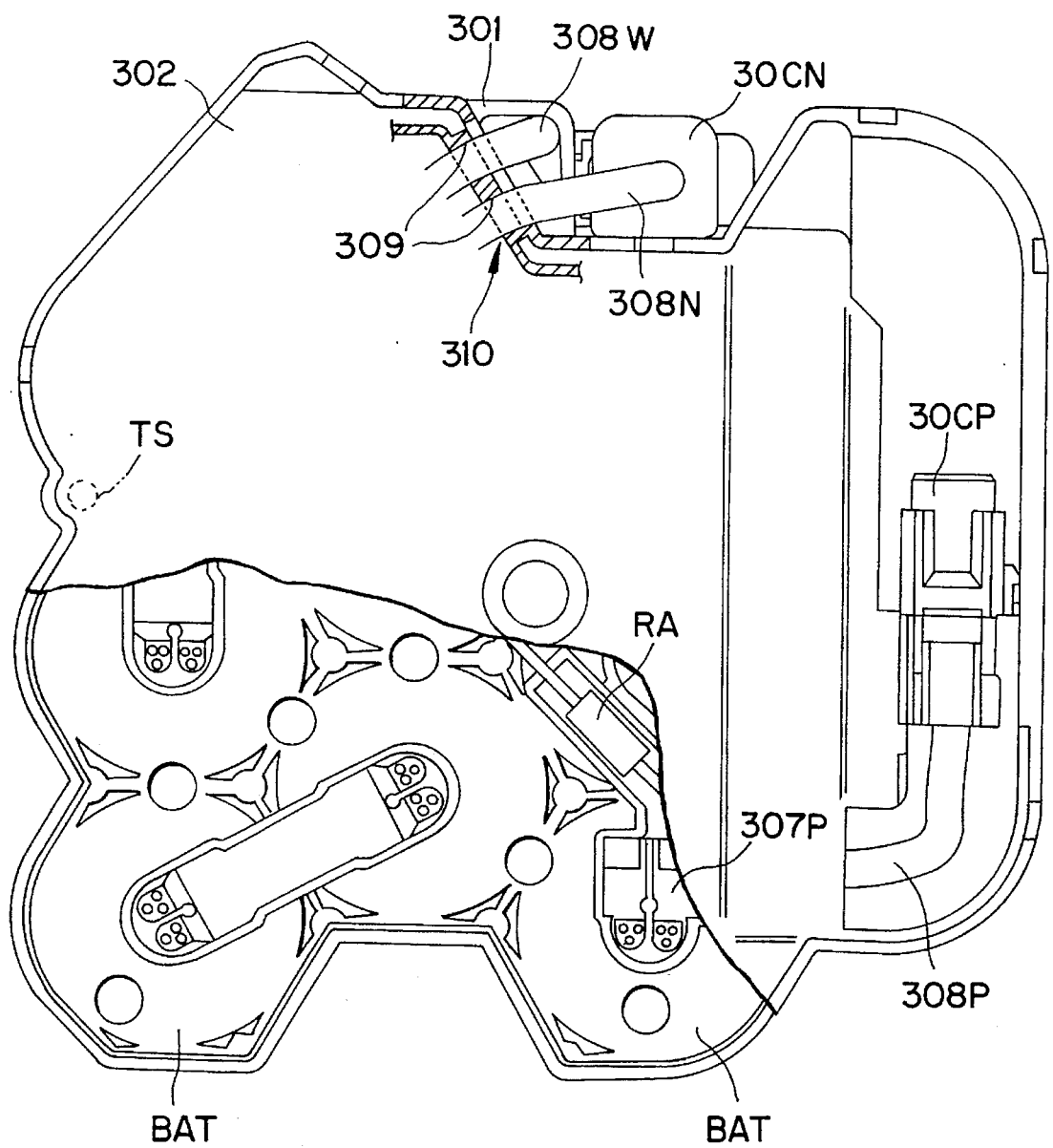
FIG. 26 is a front side view of the battery unit.
Figure 27:
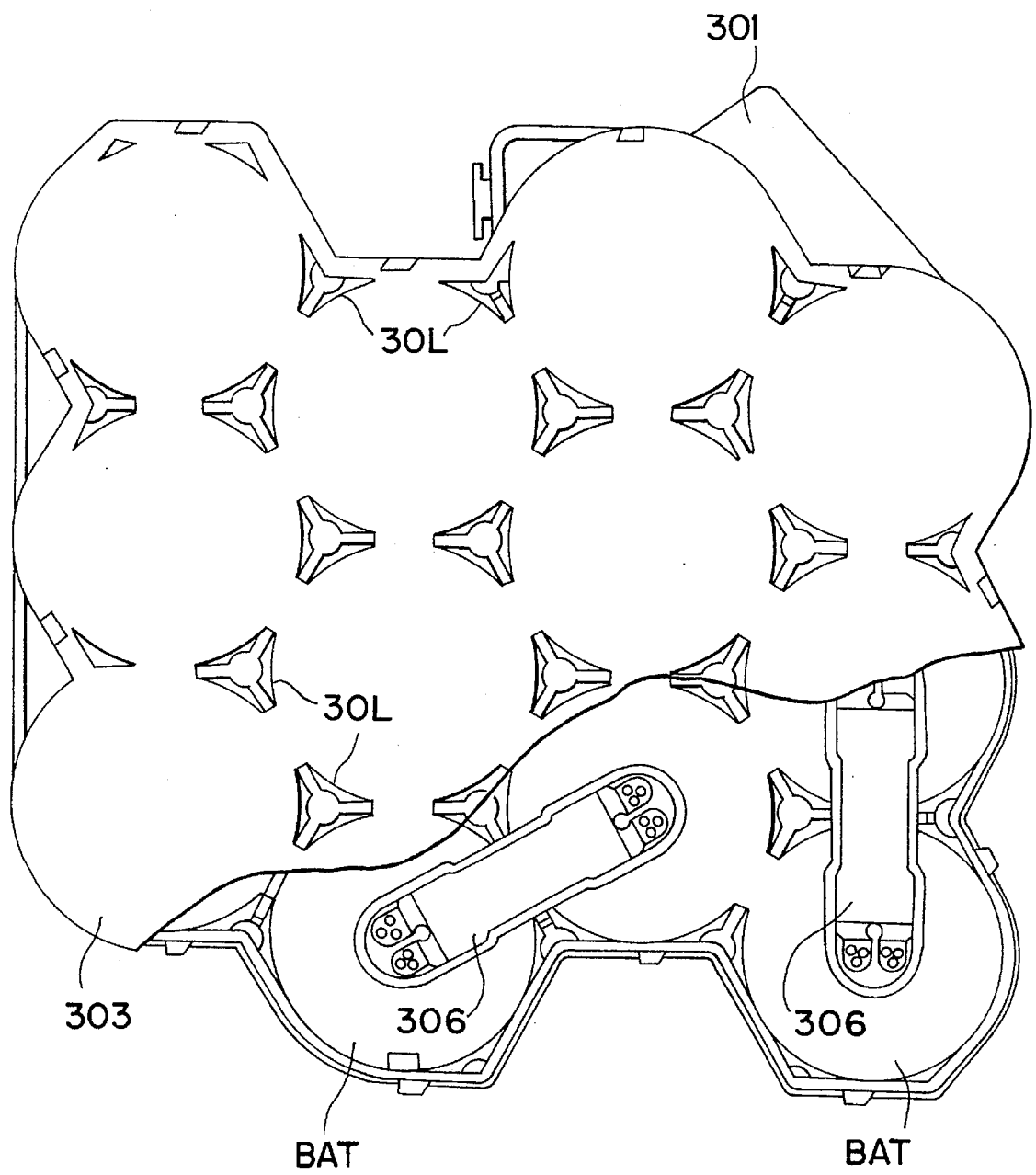
FIG. 27 is a rear side view of the battery unit.
Figure 28:
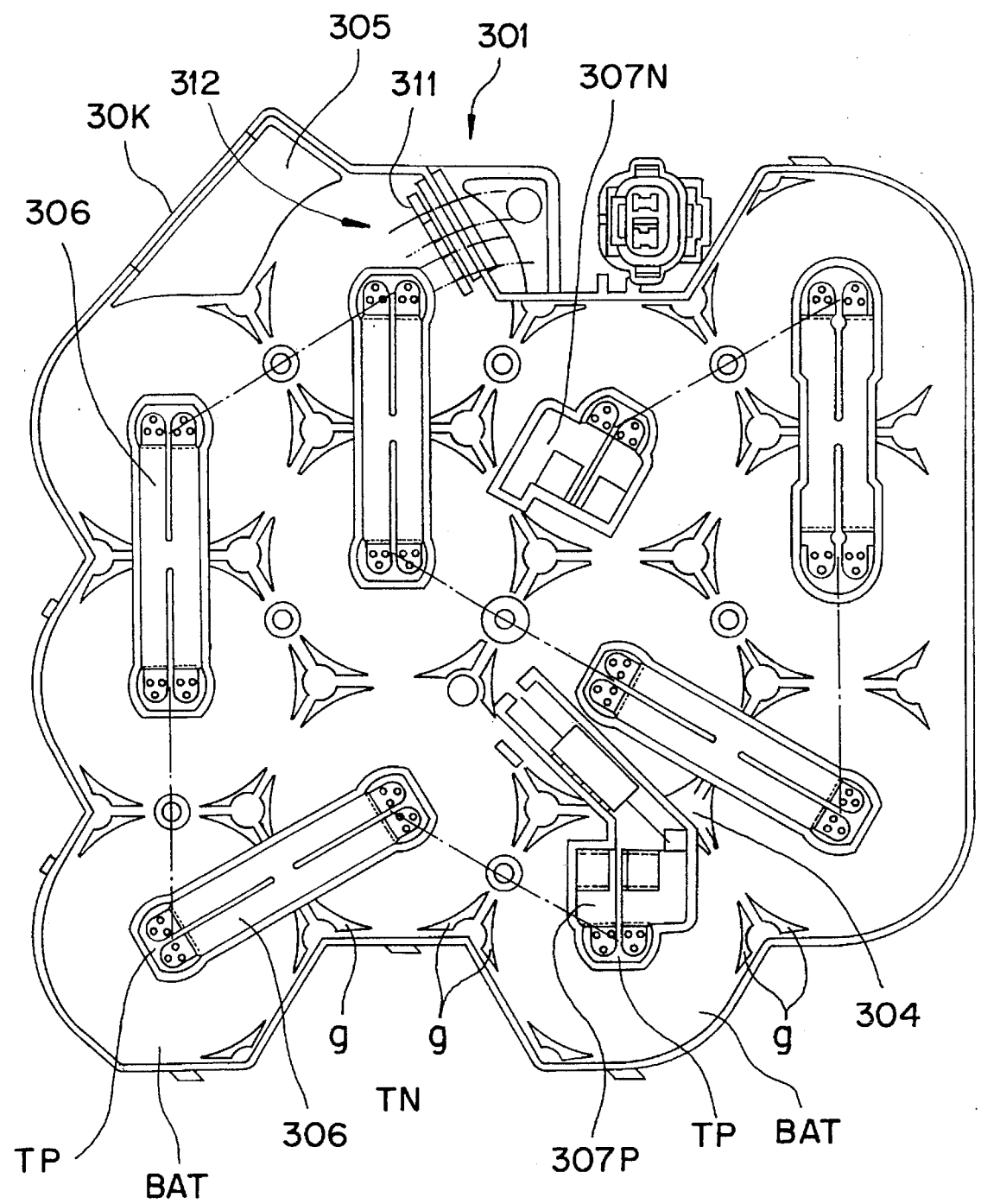
FIG. 28 is a view for explaining the connection between secondary batteries.
Figure 29:
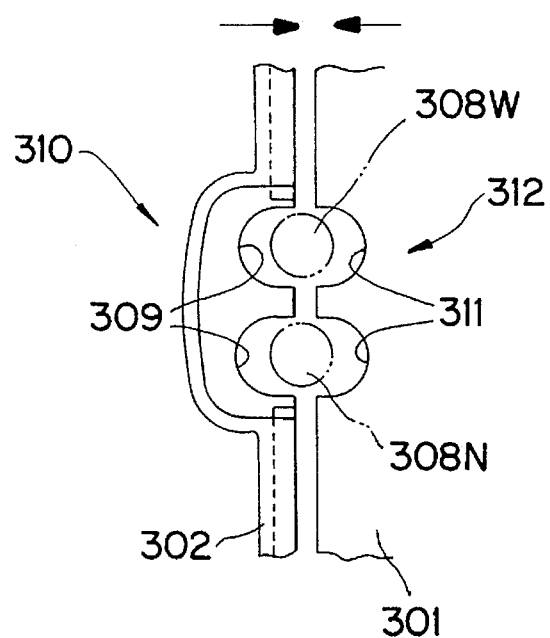
FIG. 29 is a view for explaining the structure of a cord pressing portion.
Figure 30:
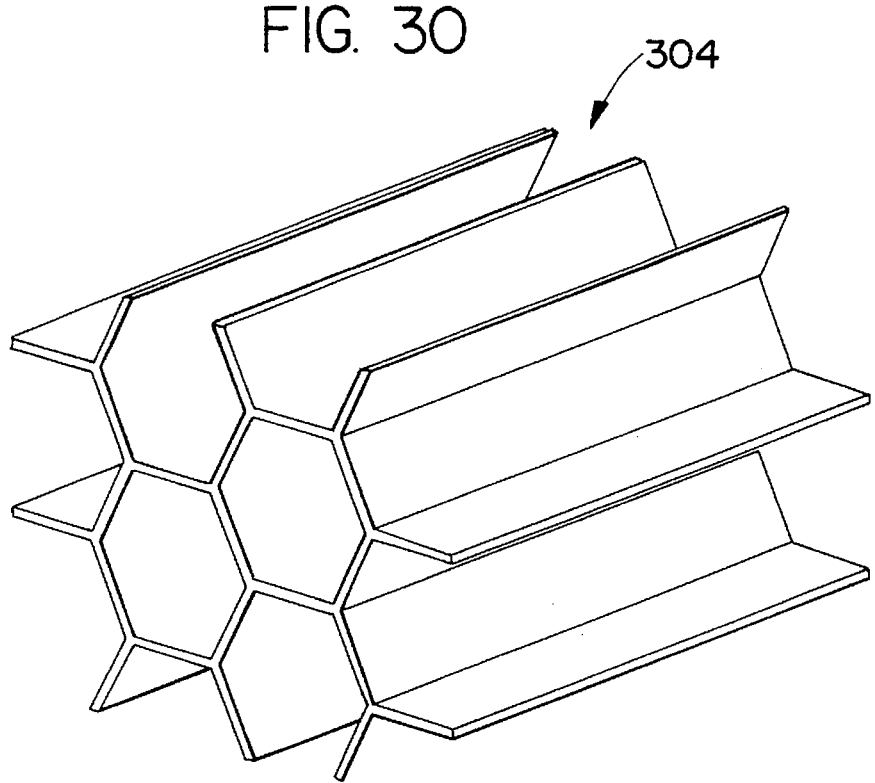
FIG. 30 is a perspective view of a partitioning member of a honeycomb structure.

FIG. 25 is a front view of a battery unit; FIG. 26 is a front side view of the battery unit; FIG. 27 is a rear side view of the battery unit; FIG. 28 is a view for explaining the connection between secondary batteries; FIG. 29 is an illustrative view of the structure of a cord pressing portion; FIG. 30 is a perspective view of a partitioning member of a honeycomb structure; and FIG. 31 is a view showing the structure of a connection terminal.

As shown in FIG. 25, in each of the battery units 30a to 30f, a front cover body 302 and a rear cover body 303 are assembled with both sides of a case main body 301 using screws.

A partitioning member 304 of a honeycomb structure shown in FIG. 30 is inserted in the interior of the case main body 301 or formed integrally with the case main body 301, to form a plurality (12) of the battery containing chambers in the case main body 301. A cylindrical secondary battery (for example, nickel-cadmium battery) BAT is inserted in each battery containing chamber in the predetermined direction.

Since the cylindrical secondary battery BAT is inserted in each of the battery containing chambers formed by the partitioning member 304 having a honeycomb structure, a plurality of gaps (g) for ventilating a cooling wind are formed between each secondary battery BAT and the partitioning member 304, as shown in FIG. 28.

Thus, air supplied from the cooling air suction port 30k in FIG. 28 is introduced to the front cover body 302 side by way of a wind introducing path 305 formed on the upper side surface of the case main body 301, passing though a plurality of gaps (g) formed between each secondary battery BAT and the partitioning member 304, and is discharged to the outside of the battery units from a plurality of the discharge ports 30L (see FIG. 27) formed on the rear cover body 303 in correspondence with the gaps (g).

As shown in FIG. 28, each secondary battery BAT is inserted such that a positive electrode TP is disposed adjacently to a negative electrode TN. The adjacent positive electrode TP and the negative electrode TN are connected to each other by means of a connection terminal 306. Thus, twelve of the secondary batteries are electrically connected in series to each other.

In this series connection, lead terminals 307P and 307N are respectively welded to positive and negative electrodes of each secondary battery.

A power lead 308P is electrically connected to the lead terminal 307P on the positive electrode side by crimping or welding, which is connected to the connector 30CP on the positive electrode side shown in FIG. 26. The connector 30CP is provided on the side portion of the front cover body 302. The connector 3OCN on the negative electrode side is provided on the upper surface of the case main body 301, which is connected to the lead terminal 307N (see FIG. 28) on the negative electrode side by way of a power lead 308N shown in FIG. 26.

One end of the resistance RA (see FIG. 26) for restricting current and dividing a voltage is connected to a signal fetching connector (not shown) provided on the upper surface of the case main body like the negative side connector 3OCN by way of a connection line (not shown).

A signal line (not shown) of the temperature detector TS shown in FIG. 26 is similarly connected to the signal fetching connector (not shown).

Power leads 308N and 308P and signal lines 308W from the temperature detector TS and the voltage dividing resistance RA are led from the mating surface between the case main body 301 and the front cover body 302. For this purpose, a main body side cord pressing portion 310 formed with a cord pressing groove 309 (semi-groove) shown in FIG. 26 is provided on the case main body 301; and a cover body side cord pressing portion 312 formed with a cord pressing groove 311 (semi-groove) shown in FIG. 28 is provided on the front cover body 302. Thus, as shown in FIG. 29, the power lead 308N and the signal line 308W are held by the cord pressing portions 310 and 312, thus fixing the cord lead portion without the use of a grommet.

Figure 31A:
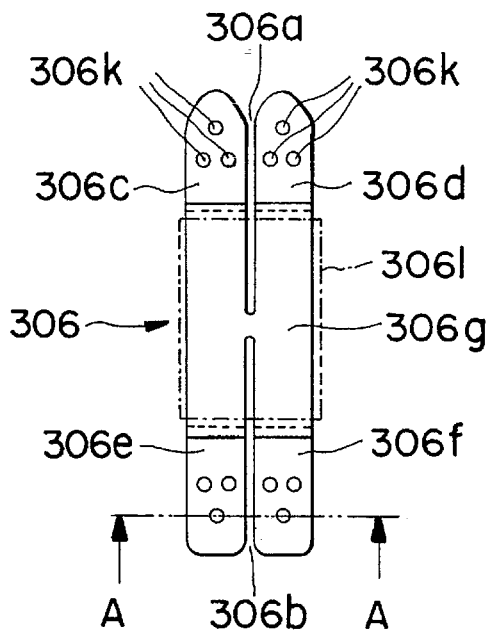
FIG. 31 (a)–(c) is a view showing the structure of a connection terminal.

As shown in the plan view of FIG. 31(a), slits 306a and 306b are formed on the connection terminal 306 in the longitudinal direction, so that welding portions 306c and 306d, and 306e and 306f are disposed symmetrically in the right and left, respectively.

Figure 31B:
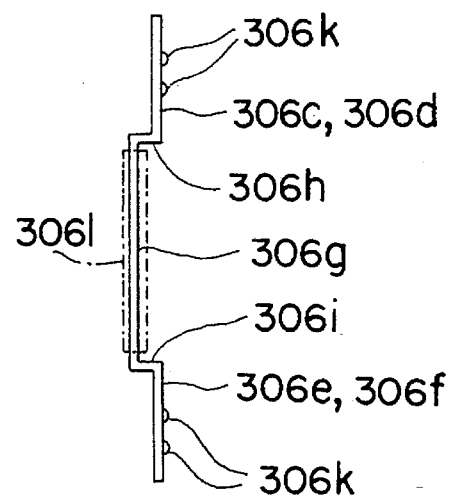

As shown in the side view of FIG. 31(b), bent portions 306h and 306i each having a stepped portion of about 1 to 2 mm are provided between each of the welding portions 306c to 306f and the center welding portion 306g, so that the tension caused by the vibration of the secondary battery BAT after welding is escaped by the bent portions 306h and 306i, and the center connection portion 306g, thus preventing the welding portions between the secondary battery and the connection terminal 306 from being applied with stress.

Figure 31C:
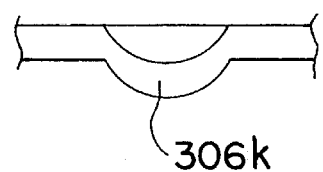
Figure 32:
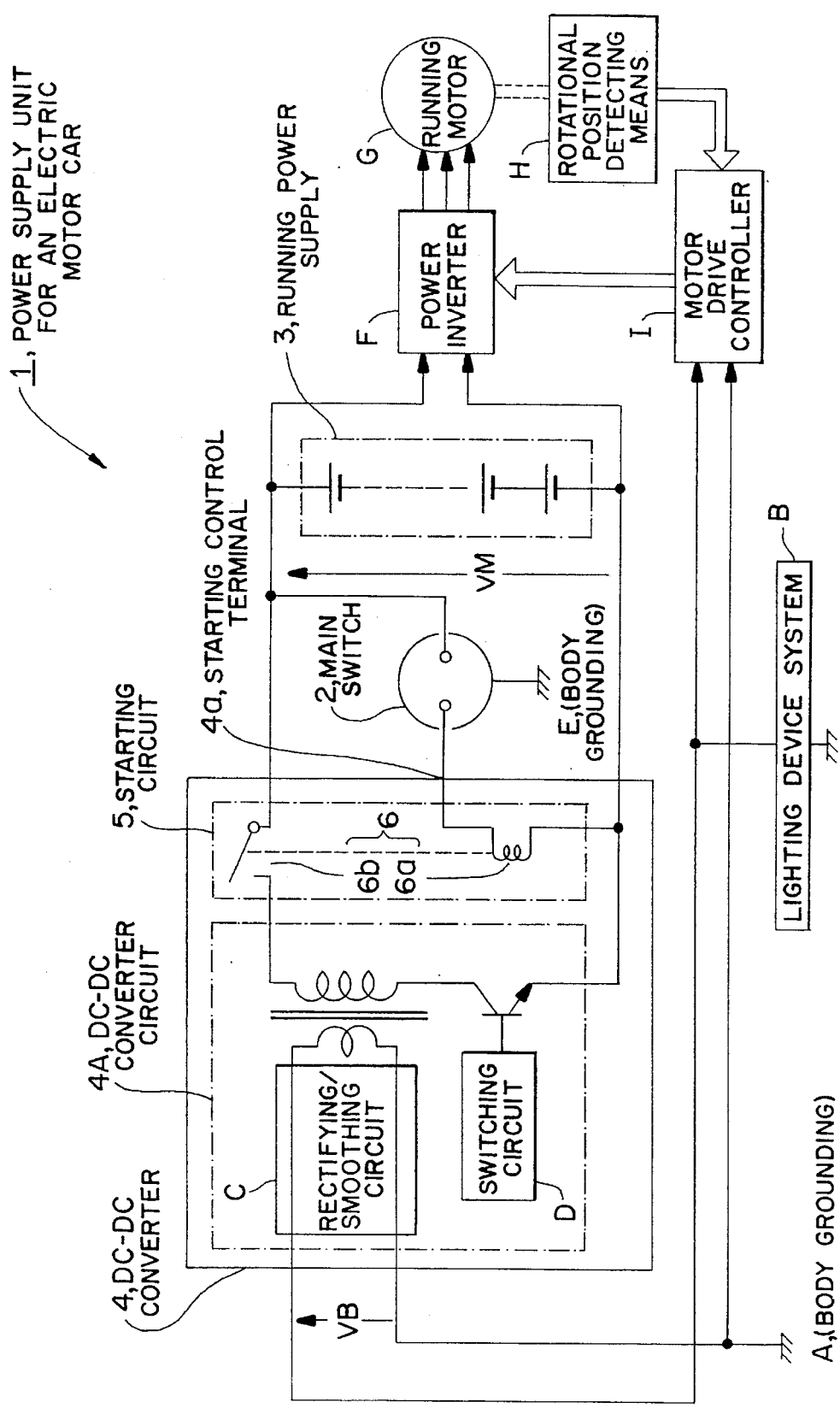
FIG. 32 is a circuit diagram of a prior art power supply unit for an electric motor vehicle.

As shown in the partially enlarged view of FIG. 31(c), a welding small projection 306k is formed on each of the welding portions 306c to 306f, to make constant the contact area between the secondary battery BAT and each of the electrodes TP and TN, thus equalizing the Welding current.

As shown in FIGS. 31(a) and 31(b), the connection portion 306g is converted with a tube or seat 3061 made of an insulating material such as vinyl chloride resin.

As shown in FIG. 25, the peripheral portions of the welding portions are coated with, for example, an epoxy resin based insulating filler 307, to seal each of the electrodes TP and TN of the secondary battery and the conductive metal portions not covered with the tube or seat 3061 made of an insulating material with the insulating filler 307, thus improving the insulating property.

As described above, in a power supply unit for an electric motor vehicle according to the present invention, a diode for preventing a leak current is interposed in a starting circuit of a DC-DC converter by way of a main switch, it is possible to prevent the flow of a leak current from a floated running power supply by way of the main switch even when the insulation resistance is reduced. Accordingly, even in the case of using a switch with a low withstand voltage between the body of the main switch and the contact, any leak current does not flow. Moreover, a starting power with a low voltage or starting signal is supplied from a battery constituting part of a running power supply with a high voltage to a DC-DC converter, so that it becomes possible to use a main switch with a low withstand voltage between the contacts.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power supply unit for an electric motor vehicle comprising:

power supply means for supplying a first power supply voltage to drive an electric motor of the vehicle, said power supply means being isolated from a grounded body of the vehicle;

converter means, operatively coupled to said power supply means, for converting said first power supply voltage into a second power supply voltage;

a switch, operatively coupled to said power supply means and said converter means, for energizing said converter means to convert said first power supply voltage into said second power supply voltage, said switch being mounted on the grounded body of the vehicle; and blocking means, operatively coupled in series between said switch and said power supply means, for preventing flow of a leakage current from said power supply means to said switch through the grounded body of the vehicle.

2. The power supply unit of claim 1, wherein said converter means comprises a step-down DC-DC converter having a primary winding which is coupled to said first power supply voltage and a secondary winding which provides said second power supply voltage as an output of said converter means.

3. The power supply unit of claim 2, wherein said converter means further comprises:

voltage control means, coupled to said secondary winding, for comparing said second power supply voltage to a reference voltage and for generating a first control signal indicative thereof; and current control means, operatively coupled to said voltage control means and said primary winding, for controlling current flow through said primary winding so that a predetermined power supply voltage is output from said secondary winding as said second power supply voltage.

4. The power supply unit of claim 3, wherein said current control means comprises:

switch means, coupled in series between said primary winding and an isolated ground of said power supply means, for passing current through said primary winding when said converter means is energized;

oscillating means for generating a second control signal; and switching control means, operatively coupled to said oscillating means, said switch means and said first control signal, for enabling said switch means in accordance with either one of said first control signal and said second control signal.

5. The power supply unit of claim 4, wherein said switching control means enables said switch means in accordance with said second control signal in absence of receipt of said first control signal from said voltage control means.

6. The power supply unit of claim 3, wherein said converter means further comprises coupling means for supplying said first control signal from said voltage control means to said current control means optically.

7. The power supply unit of claim 1, wherein said power supply means comprises a plurality of batteries coupled in series.

8. The power supply unit of claim 7, wherein said switch comprises a first terminal operatively coupled to a first of said plurality of batteries via said blocking means and a second terminal coupled to said converter means.

9. The power supply unit of claim 1, wherein said blocking means comprises a diode.

10. The power supply unit of claim 1, wherein said second power supply voltage is an accessory power supply voltage.

11. A power supply unit for an electric motor car comprising:

a running power supply, for supplying running power to a running motor of the electric motor car, including a plurality of batteries coupled in series, said running power supply being in a floating state with respect to body grounding of the electric motor car;

a step-down type DC-DC converter having an input side insulated from the body grounding; and a diode and a main switch coupled in series for supplying a starting signal from said running power supply to said input side of said step-down type DC-DC converter upon manipulation of said main switch, said diode being coupled to one of said plurality of batteries of said running power supply, said step-down type DC-DC converter converting the running power, output from said running power supply and coupled to the input side, into a step-down accessory power supply from an output side thereof upon receipt of said starting signal.

12. The power supply unit of claim 11, further comprising:

voltage control means, coupled to said output side of said step-down type DC-DC converter, for comparing a detected voltage of said step-down accessory power supply to a reference voltage and for generating a first control signal; and current control means, operatively coupled to said voltage control means and said input side of said step-down type DC-DC converter, for controlling current flow through said input side so that a predetermined power supply is output from said output side as said step-down accessory power supply.

13. The power supply unit of claim 12, wherein said current control means comprises:

switch means, coupled in series between said input side winding and a floating ground of said running power supply for passing current through said input side when said step-down type DC-DC converter is energized;

oscillating means for generating a second control signal; and switching control means, operatively coupled to said oscillating means, said switch means and said first control signal, for enabling said switch means in accordance with either one of said first control signal and said second control signal.

14. The power supply unit of claim 13, wherein said switching control means enables said switch means in accordance with said second control signal in absence of receipt of said first control signal from said voltage control means.

15. The power supply unit of claim 11, further comprising coupling means for supplying said first control signal from said voltage control means to said current control means optically.

16. The power supply unit of claim 12 wherein said step-down accessory power supply comprises a first power supply for a control system of the electric motor car and a second power supply for a lighting system of the electric motor car.

17. The power supply unit of claim 16, wherein said voltage control means compares a detected voltage of said second power supply.

* * * * *